US011618616B2

(12) United States Patent
Dwork

(10) Patent No.: US 11,618,616 B2
(45) Date of Patent: Apr. 4, 2023

(54) LID

(71) Applicant: Michael D. Dwork, New York, NY (US)

(72) Inventor: Michael D. Dwork, New York, NY (US)

( * ) Notice: Subject to any disclaimer, the term of this patent is extended or adjusted under 35 U.S.C. 154(b) by 339 days.

(21) Appl. No.: 16/784,924

(22) Filed: Feb. 7, 2020

(65) Prior Publication Data

US 2021/0245934 A1 Aug. 12, 2021

(51) Int. Cl.
*B65D 43/16* (2006.01)
*B65D 43/22* (2006.01)

(52) U.S. Cl.
CPC ........... *B65D 43/169* (2013.01); *B65D 43/22* (2013.01); *B65D 2251/1033* (2013.01); *B65D 2251/1058* (2013.01); *B65D 2543/00101* (2013.01); *B65D 2543/00666* (2013.01); *B65D 2543/00759* (2013.01)

(58) Field of Classification Search
CPC ............ B65D 2251/105; B65D 43/169; B65D 2251/1033; B65D 21/0219; B65D 43/22; B65D 2543/00101; B65D 2543/00953
See application file for complete search history.

(56) References Cited

U.S. PATENT DOCUMENTS

| | | | |
|---|---|---|---|
| 3,799,426 A | 3/1974 | Pates et al. | |
| 4,771,934 A | 9/1988 | Kalmanides | |
| 5,474,199 A | 12/1995 | Julius et al. | |
| 7,922,021 B2 * | 4/2011 | Golden | B65D 43/169 220/4.21 |
| 10,159,367 B2 | 12/2018 | Buck | |
| 10,232,997 B2 | 3/2019 | Engel et al. | |
| 10,246,220 B2 | 4/2019 | Buck et al. | |
| 10,479,554 B2 | 11/2019 | Dziaba et al. | |
| 10,494,155 B2 | 12/2019 | Snedden et al. | |
| 2004/0056040 A1 | 3/2004 | Ziegler | |
| 2021/0214131 A1 * | 7/2021 | Knutson | B65D 43/169 |
| 2021/0245933 A1 | 8/2021 | Dwork | |
| 2021/0245935 A1 | 8/2021 | Dwork | |
| 2021/0295934 A1 | 9/2021 | Dozaka | |

OTHER PUBLICATIONS

U.S. Appl. No. 16/784,918, filed Feb. 7, 2020, 74 pages.
U.S. Appl. No. 16/784,934, filed Feb. 7, 2020, 73 pages.

* cited by examiner

*Primary Examiner* — Shawn M Braden
(74) *Attorney, Agent, or Firm* — Merchant & Gould P.C.

(57) ABSTRACT

A lid for outfitting a container is provided. The lid includes a cover shell defining a first cavity, a clamp including a frustum portion, a hinge member constructed to pivotally interconnect the clamp with the cover shell. The cover shell is releasably lockable to the clamp.

14 Claims, 34 Drawing Sheets

LID

BACKGROUND

Field

Example aspects described herein relate generally to containers for housing food, and more particularly to a lid for housing a dish.

Related Art

As used herein, a dish is anything that is used to prepare, serve or eat a meal. Example dishes include a plate, bowl, saucer, platter, vessel, tray, or similar container.

It is known to use containers for packaging and transporting all types of food-related goods. The food is oftentimes placed inside so called "takeaway" containers for storage and transporting (also interchangeably referred to as "to-go" or "meal-kit" containers). Sometimes dishes are placed wholly within such containers. Containers are typically made of aluminum, polypropylene (plastic), polystyrene (STYROFOAM) or of a compostable-type material such as wheat, sugarcane, balsa wood, palm leaf and paper, to name a few. Billions of such containers are used each year.

Typical polypropylene containers have desirable properties. They are durable, lightweight, waterproof, versatile, and cost effective. However, polypropylene containers by far have the biggest environmental impacts. Of the millions of metric tons of packaging made of polypropylene produced globally each year, a relatively small fraction of it is recycled. The problem is expected to get worse as people continue to consume more packaged foods, and continue to purchase meal-kit and take-out foods.

The major benefits to the environment that compostable packaging provide are numerous. Compostable packaging, require less carbon to produce, reduce the amount of waste sent to landfills, reduce levels of pollution in the air, groundwater and soil, and provide the earth with life-promoting nutrients.

All types of packaging materials are affected by elements of the environment such as light, relative humidity, and temperature. While they affect packaging material in different ways, the consequences are generally the same: poor packaging qualities (e.g., lids that become stuck, lids that become loose, leaks, and the like). In the case of a container-lid/container-base system, where the container-lid is mated to a container-base, for example, the temperature and humidity of the container-lid is oftentimes different from the humidity and temperature of the container-base.

Even in the case where the materials of the container-lid and container-base are the same, the container-lid and container-base may have conflicting thermal expansion rates and thus react differently to the same changes in the environment. When a polypropylene plate deforms due to heat or humidity, for example, a typical container-lid mated to the container-base can still pop off or otherwise become dislodged.

Non-compostable materials can expand as temperature increases as well. This can be of particular importance when a non-compostable material is mated with another type of material having very different thermal expansion rates, such as in the case of a compostable material mated with a non-compostable material.

Further, with regard to compostable packaging, for example, fluctuating moisture and/or temperature can also cause stress to fibers as they alternately swell and contract, resulting in deformations, such as undulations, bulges, and distortions in the dimensions of the compostable packaging.

There exists a need for an improved way to house and transport food products that provides the benefits of polypropylene. There also exists a need for an improved ways to house and transport food products that provide the benefits of both compostable and non-compostable materials.

BRIEF DESCRIPTION

The example embodiments described herein meet the above-identified needs by providing an improved lid construction or assembly for outfitting a container.

In one embodiment, a lid (100) for outfitting a container is provided, the lid comprising: a cover shell (102) defining a first cavity (10); a first lid rim (104) defining an opening (108); a hinge member (106) constructed to pivotally interconnect the first lid rim (104) with the cover shell (102); the cover shell (102) releasably lockable to the first lid rim (104).

In some embodiments, the first lid rim (104) defines no cavity. In some embodiments, the cover shell (102) has an outer radial shape that generally corresponds to the shape of the first lid rim (104).

The opening (108) is constructed to receive a dish (150).

In some embodiments, the lid is made of a first material and dish (150) is made of a second material, wherein the first material and the second material have different thermal expansion properties.

In some embodiments, the cover shell (102) comprises a cover shell horizontal flange (120) provided about the periphery of the cover shell (102); and In some embodiments, the first lid rim (104) is constructed to receive through the opening (108) a dish (150) having a dish flange (152) until the dish flange 152 rests on the first lid rim (104).

In some embodiments, the lid further comprises a seal integrally formed on the cover shell horizontal flange (120) constructed to prevent liquid from passing from the inner edge (120A) to the outer edge (120B).

In some embodiments, the lid further comprises a seal integrally formed on the first lid rim (104) constructed to prevent liquid from passing between from the inner edge (104A) to the outer edge (104B).

In some embodiments, the lid further comprises a locking mechanism (110) constructed to releasably secure the cover shell (102) to the first lid rim (104).

In some embodiments, the locking mechanism (110) is any one of: a locked by a tab mechanism, at least one latch, at least one fasteners, or a pre-sealable zipper interlocking mechanism.

In some embodiments, the cover shell (102) comprises a cover shell horizontal flange (120) provided about the periphery of the cover shell (102); the first lid rim (104) includes female elements (110-2) formed on corresponding locations on the first lid rim (104); and the locking mechanism (110) includes male elements (110-1) formed on locations of the cover shell horizontal flange (120) and adapted to be received in the female elements (110-2) formed on corresponding locations on the first lid rim (104).

In some embodiments, the male elements (110-1) and the female elements (110-2) are arranged to be located adjacent to the outer edge (152B) of a dish flange (152) of the dish (150).

In some embodiments, between an outer edge (152B) of the dish flange (152) and the locking mechanism (110) is a gap (GAP).

In another embodiment, a lid (200) is provided for outfitting a container, the lid comprising: a cover shell (202) defining a first cavity (30); a clamp (204) includes a frustum portion (222); a hinge member (206) constructed to pivotally interconnect the clamp (204) with the cover shell (202); and the cover shell (202) releasably lockable to the clamp (204).

In some embodiments, the frustum portion (222) includes at least one of (i) a pyramidal frustum portion, (ii) a conical frustum portion, (iii) a spherical frustum portion, or (iv) any combination of (i), (ii) and (iii).

In some embodiments, clamp (204) is constructed to support a dish (250).

In some embodiments, clamp (204) further comprises a clamp top opening (302); and a clamp bottom opening (304).

In some embodiments, clamp top opening (302) is formed in any one of a radial shape, an oval shape, a round shape, or a rounded shape.

In some embodiments, the clamp top opening (302) generally conforms to a shape of a portion of a dish (250) that is inserted through the clamp (204).

In some embodiments, the cover shell (202) includes a cover shell horizontal plateau (220) and the clamp (204) includes a clamp horizontal plateau (208) having a shape corresponding generally to the shape of the cover shell horizontal plateau (220).

In some embodiments, the cover shell (202) includes a downstanding lip (216) extending from a cover shell horizontal plateau (220); and the clamp (204) includes an upstanding lip (218) extending from a clamp horizontal plateau (208), and when the cover shell (202) is closed over the clamp (204), the downstanding lip (216) operates as a skirt surrounding upstanding lip (218).

In some embodiments, the clamp (204) further includes a dish coupler (312) constructed to releasably engage with a dish (250).

In some embodiments, the dish coupler (312) includes a dish coupler outer lip (314) and a dish coupler trough (316).

In some embodiments, the dish coupler (312) is a protrusion integrally formed on the frustum portion (222).

In some embodiments, the cover shell (202) releasably secured to the clamp (204) using a locking mechanism (210).

In some embodiments, the locking mechanism (210) includes a male element (210-1) formed on the clamp horizontal plateau (208) and adapted to be received in female element (210-2) formed on a corresponding location on the cover shell horizontal plateau (220) of the cover shell (202).

In some embodiments, the male element (210-1) and the female element (210-2) constructed to be in snap engagement to securely lock the cover shell (202) to clamp (204).

In some embodiments, the lid (200) is made of a first material and dish (250) is made of a second material, wherein the first material and the second material have different thermal expansion properties.

In another embodiment, a lid (700) for outfitting a container is provided, the lid comprising: a cover shell (702) defining a first cavity (50); a clamp (704) includes a frustum portion (722), a clamp horizontal plateau (708), and an upstanding lip (718); a hinge member (706) constructed to pivotally interconnect the clamp (704) with the cover shell (702); and the cover shell (702) releasably lockable to the clamp (704).

In some embodiments, the frustum portion (722) includes at least one of (i) a pyramidal frustum portion, (ii) a conical frustum portion, (iii) a spherical frustum portion, or (iv) any combination of (i), (ii) and (iii).

In some embodiments, clamp (704) is constructed to support a dish (750).

In some embodiments, clamp (704) further comprises: a clamp top opening (705); and a clamp bottom opening (707).

In some embodiments, clamp top opening (705) is formed in any one of a radial shape, an oval shape, a round shape, or a rounded shape.

In some embodiments, the clamp top opening (705) generally conforms to a shape of a portion of a dish (750) that is inserted through the clamp (704).

The lid according to claim 1, the cover shell (702) includes a cover shell horizontal plateau (740) and the clamp (704) includes a clamp horizontal plateau (708) having a shape corresponding generally to the shape of the cover shell horizontal plateau (740).

In some embodiments, the clamp (704) further includes a dish coupler (712) constructed to releasably engage with a dish (750).

In some embodiments, the cover shell (702) includes a downstanding lip (716) extending from a cover shell horizontal plateau (740); and the clamp (704) includes an upstanding lip (718) extending from a clamp horizontal plateau (708), and when the cover shell (702) is closed over the clamp (704), the downstanding lip (716) operates as a skirt surrounding upstanding lip (718).

In some embodiments, the dish coupler (712) is located above the clamp horizontal plateau.

In some embodiments, the dish coupler (712) is a protrusion integrally formed on the upstanding lip (718).

In some embodiments, the cover shell (702) releasably secured to the clamp (704) using a locking mechanism 210.

In some embodiments, the locking mechanism (210) includes a male element (210-1) formed on the clamp horizontal plateau (708) and adapted to be received in female element (210-2) formed on a corresponding location on the cover shell horizontal plateau (740) of the cover shell (702).

In some embodiments, the male element (210-1) and the female element (210-2) constructed to be in snap engagement to securely lock the cover shell (702) to clamp (704).

In some embodiments, the lid (700) is made of a first material and dish (750) is made of a second material, wherein the first material and the second material have different thermal expansion properties.

DESCRIPTION

Aspects of the embodiments described herein provide an improved lid construction or assembly for outfitting a dish.

Embodiment 1

Figure 1:
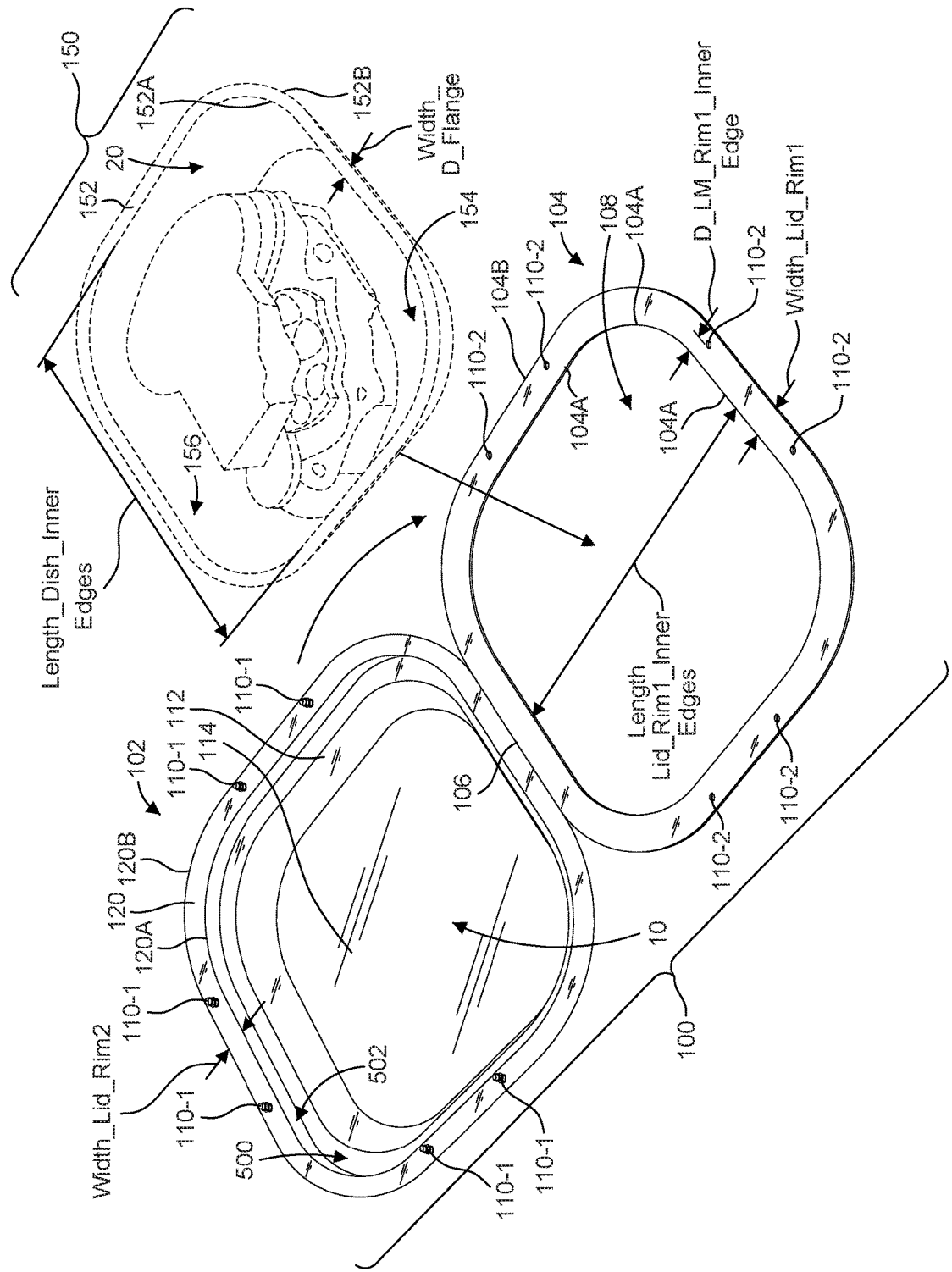
FIG. 1 is a perspective view of a lid according to an example embodiment of the present invention.

FIG. 1 is a perspective view of a lid 100 according to an example embodiment of the present invention. Lid 100 is constructed to outfit a dish 150. Lid 100 includes a cover shell 102 and a first lid rim 104. The first lid rim 104 defines an opening 108. The cover shell 102 defines a first cavity 10 and the dish 150 defines a second cavity 20. The first lid rim 104 does not define a cavity.

In an example embodiment, cover shell 102 has at least one portion having a shape that generally corresponds to a shape of the first lid rim 104. For example, as shown in FIG. 1, the shape of the cover shell 102 is formed by one or more side walls 112 which extend inwardly from a cover shell horizontal flange 120 to a cover shell top 114 of the cover shell 102. While the first lid rim 104 shown in FIG. 1 defines an opening 108 that has a shape of a rounded rectangle, it will be understood that in other embodiments the first lid rim 104, along with the overall associated lid 100 of the present invention, can take on other shapes, such as a radial, an oval, a round, or rounded shape.

In some embodiments, the one or more side walls 112 can be arrayed and separated by plateaus. In yet another embodiment, the one or more side walls 112 can be continuous. Optionally, the walls can include ribs.

The cover shell 102 and first lid rim 104 are pivotally interconnected by a hinge member 106. In some embodiments, the hinge member 106 is formed integrally with the cover shell 102 and first lid rim 104. In other words, lid 100 can be a one piece molded construction.

In an alternative embodiment, cover shell 102 and first lid rim 104 can be formed as separate components. In other words, lid 100 can be a two piece molded construction.

The first lid rim 104 has an inner edge 104A and an outer edge 104B defining a first lid rim 104 width (Width_Lid_Rim1).

In some embodiments, the cover shell 102 has a horizontal flange provided about the periphery of the cover shell 102, referred to herein as a cover shell horizontal flange 120. The cover shell horizontal flange 120 can further include a downstanding lip (not shown). The cover shell horizontal flange 120 has an inner edge 120A and an outer edge 120B defining a width of the cover shell horizontal flange 120 (Width_Lid_Rim2).

The thickness of first lid rim 104 (Thickness_Lid_Rim1) can be the same as or different from the thickness of cover shell horizontal flange 120 (Thickness_Lid_Flange). In one example embodiment, Thickness_Lid_Rim1 is approximately double that of Thickness_Lid_Flange.

FIG. 1 also depicts a dish 150. It should be understood that dish 150 need not form part of the lid 100. In other words, in one embodiment, lid 100 is manufactured independently of dish 150. This allows lid 100 and dish 150 to be manufactured by the same or different manufacturers. Alternatively, in another embodiment, lid 100 and dish 150 are manufactured by the same manufacturer.

In some embodiments, dish 150 has a dish flange 152 and a dish sidewall 156. The dish flange 152 has an inner edge 152A and an outer edge 152B. The distance between inner edge 152A and outer edge 152B define a width of the dish flange 152 (Width_D_Flange). In the case of a square or rectangular dish, the length between two parallel inner edges 152A of dish flange 152 (Length_Dish_InnerEdges) is shorter than the length between two corresponding parallel inner edges 104A of the first lid rim 104 (Length_Lid_Rim1_InnerEdges). In the case of a bowl-type dish, the radius of the inner edge 152A of dish flange 152 is shorter than the radius of a corresponding inner edge 104A of the first lid rim 104. The remaining dimensions of the dish can vary according to the desired volume of the second cavity 20 (e.g., length, depth, radius, width, and the like). Other shapes of dishes that have dimensions substantially the same as the dimension of opening 108 can be outfitted by first lid rim 104.

Figure 2:
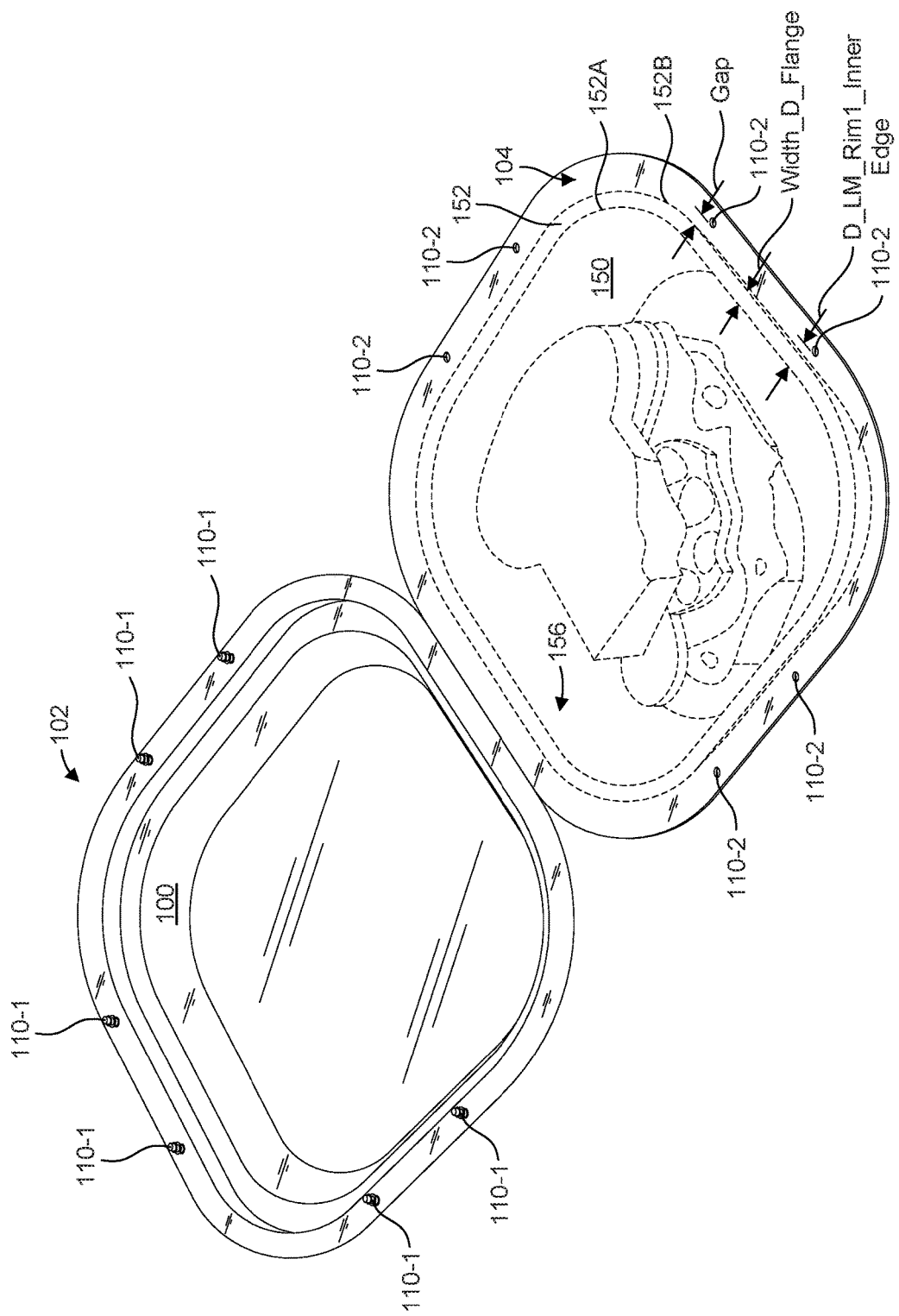
FIG. 2 is a perspective view of a lid in usage with a cover shell of the lid in the open position according to an example embodiment of the present invention.

FIG. 2 a perspective view of a lid 100 in usage with a cover shell 102 of the lid in the open position according to an example embodiment of the present invention. As shown in FIGS. 1 and 2, the first lid rim 104 is constructed to receive, through the opening 108, dish 150 until a portion of dish 150 (e.g., dish flange 152) rests on the first lid rim 104. The first lid rim 104 provides a place for support of the dish 150 when the portion of dish 150 (e.g., dish flange 152) rests on the first lid rim 104. As explained above in connection with FIG. 1, in the case of a square or rectangular dish, the lengths between two sets of parallel inner edges 152A of dish flange 152 (Length_Dish_InnerEdges) are shorter than the length between two sets of corresponding parallel inner edges 104A of the first lid rim 104 (Length_Lid_Rim1_InnerEdges). This allows the dish flange 152 to rest on the first lid rim 104 and prevents interference by a dish sidewall 156. Similarly, in the case of a bowl-type dish, the radius as defined by the inner edge 152A of dish flange 152 of the bowl is shorter than the radius of a corresponding radius of the first lid rim 104, also to allow the dish flange 152 to rest on the first lid rim 104 and to prevent interference by dish sidewall 156.

In some embodiments, first lid rim 104 includes an upstanding lip (not shown) extending from outer edge 104B, constructed to surround outer edge 120B.

Figure 3:
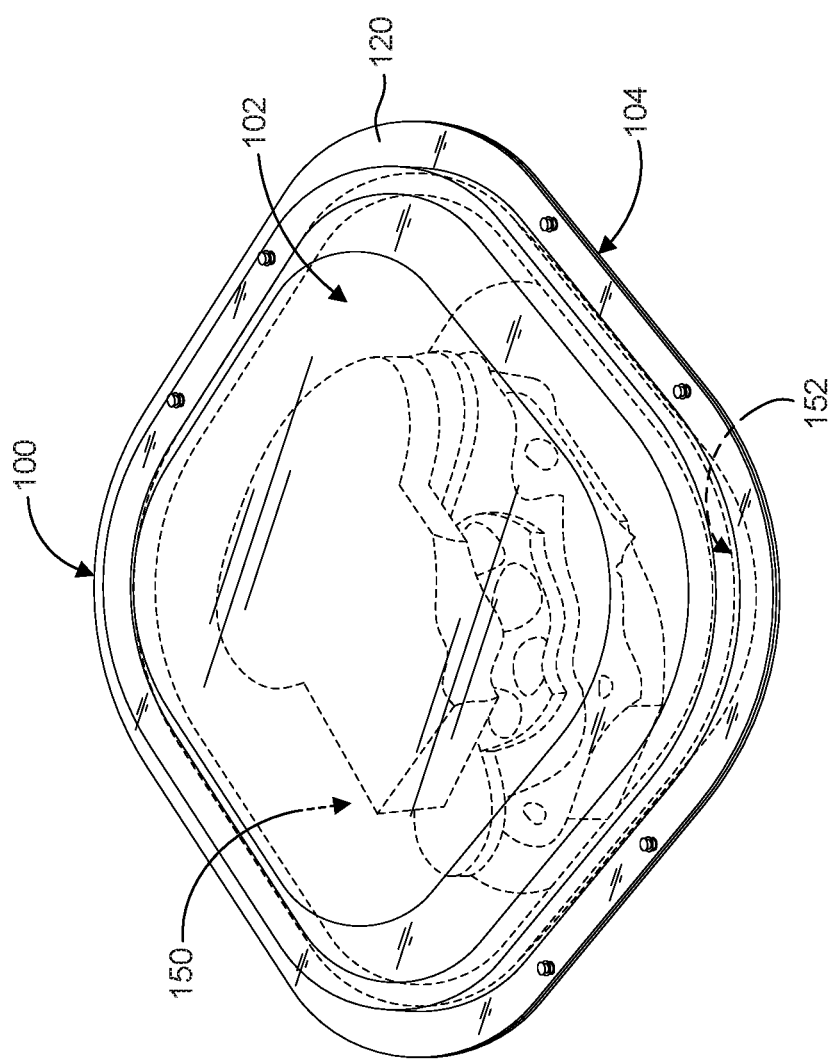
FIG. 3 depicts a perspective view of a lid in usage when a cover shell of the lid is locked to a first lid rim of the lid in accordance with an example embodiment of the present invention.

FIG. 3 depicts a perspective view of a lid 100 in usage when a cover shell 102 of the lid 100 is detachably secured to the first lid rim 104, in accordance with an embodiment of the present invention. The dish flange 152 of dish 150 becomes seated between the first lid rim 104 and cover shell horizontal flange 120 when the cover shell 102 of the lid 100 is detachably secured to the first lid rim 104. The first lid rim 104 and cover shell horizontal flange 120 secure the dish 150 by the application of clamping pressure generated when the cover shell 102 of the lid 100 is locked to the first lid rim 104. The clamping pressure is an inward force provided by the cover shell 102 and first lid rim 104 divided by the surface area being constrained. In an embodiment in which the cover shell 102 has cover shell horizontal flange 120, the clamping pressure is particularly the inward force provided by the cover shell horizontal flange 120 and first lid rim 104 divided by the surface area being constrained, which is substantially the surface area of the dish flange 152.

Referring again to FIG. 1, in some embodiments, the cover shell 102 is releasably secured to the first lid rim 104 using a locking mechanism 110. The terms "releasably secured", "releasably engaged", "releasably attached", "releasably locked", "detachably secured", "detachably engaged", "detachably attached" and "detachably locked" should be understood to be interchangeable. "Releasably" and "detachably" as used herein mean requiring separation without loss or damage. In an example embodiment, the locking mechanism 110 includes one or more male elements 110-1 and one or more corresponding female elements 110-2. The male elements 110-1 are formed on locations of a cover shell horizontal flange 120 and adapted to be received in female elements 110-2 (e.g., bores) formed on corresponding locations on first lid rim 104. The male elements 110-1 and female elements 110-2 are constructed to be in snap engagement to releasably secure the cover shell 102 to the first lid rim 104. It should be understood that the locking mechanism 110 depicted in FIGS. 1, 2 and 3 is merely an example. Lid 100 can include another now known or future known locking mechanism that releasably secures dish 150 between the cover shell 102 and the first lid rim 104. Such other interlocking mechanisms would still be within the scope of the invention (e.g., a tab-interlocking mechanism, a latch, a fastener, a re-sealable zipper interlocking mechanism, etc.).

As explained above, environmental elements (such as light, relative humidity, and temperature) affect compostable and polypropylene packaging differently. Similarly, such elements affect different parts of packaging made from the same material. One technical problem solved by aspects of the present invention relates to minimizing the effect changes in the elements of the environment have on different parts of packaging. Changes in the elements of the environment can affect the mechanical connections of conventional lid/dish combinations. In some cases the lids either pop off the dish and in some cases they become more difficult to remove.

The solution is to provide a lid that clamps dish flange such that changes is the dimensions of the lid 100 and dish 150 caused by the elements do not substantially affect the clamping pressure holding the dish in place between first lid rim 104 and cover shell horizontal flange 120. According in some embodiments, the combination of the cover shell horizontal flange 120 and the first lid rim 104 provide a clamping pressure on the dish flange 152 sufficient to create a friction that prevents the dish from substantially sliding while allowing the dimensions of the lid 100 and dish 150 to expand, contract or otherwise deform differently. It will be understood that the amount of sliding friction created by the clamping pressure can be expressed as a coefficient which takes into consideration the various factors that can affect the level of friction. Some aspects of lid 100 and dish 150 that can impact sliding friction include the surface deformation of the dish 150; the roughness/smoothness of the surface of the first lid rim 104, cover shell horizontal flange 120, and dish flange 152; the areas of surface of the first lid rim 104, cover shell horizontal flange 120, and dish flange 152, the amount of pressure on dish flange 152 and the adhesion of the surfaces of the first lid rim 104, cover shell horizontal flange 120, and dish flange 152. Variations of such factors can be made and still be within the scope of the present invention.

In one example embodiment, the elements of lid 100 are formed from the same material as dish 150. The cooperation of the cover shell 102 and the first lid rim 104 when housing a dish 150 are not affected by differences in deformations of the lid 100 and dish 150 that are subject to the same elements of the environment. In another example embodiment, the elements of lid 100 are formed from a different material than dish 150. The cooperation of the cover shell horizontal flange 120 and the first lid rim 104 when housing a dish 150 also are not substantially affected by differences in deformations of the lid 100 and dish 150 that are subject to the same elements of the environment.

As shown in FIG. 2, the locking mechanism 110 is arranged in non-interfering relation with dish flange 152. In an example implementation, the male elements 110-1 and the female elements 110-2 are located adjacent to the outer edge 152B of the dish flange 152. In some embodiments, between the outer edge 152B of the dish flange 152 and the locking mechanism 110 is a gap (GAP)(e.g., 1-6 mm). The gap is sufficient to account for expansion or contraction of the lid 100 and/or dish 150 caused by changes in the elements of the environment.

Dish 150 can have an irregular shape. For example, in some embodiments, the dish flange 152 is not flat. To account for this, in some embodiments, hinge member 106 can be constructed to flexibly adjust according to a variation in the topology of the dish flange 152. For example, the hinge member 106 can be formed to be W-shaped such that the joint of the hinge member 106 creates a predictable fold lines for pivotally folding the cover shell 102 over the first lid rim 104.

In some embodiments, a seal is provided between the cover shell horizontal flange 120 and dish flange 152. In an example implementation, a seal is integrally formed on the cover shell horizontal flange 120 so that when the cover shell 102 and first lid rim 104 are closed around the dish flange 152, the connection resists the passage of material stored within between the inner edge 120A and an outer edge 120B. In an example implementation, the seal is positioned substantially over outer edge 152B of the dish flange 152. In some embodiments, the seal is integrally formed on the cover shell horizontal flange 120 to prevent liquid from passing between the inner edge 120A and the outer edge 120B. In some embodiments, the seal is integrally formed on the first lid rim 104 to prevent liquid from passing between the inner edge 104A and the outer edge 104B. In yet another embodiment, a first seal is formed on the cover shell horizontal flange 120 and a second seal is formed on the first lid rim 104.

The combination of the cover shell 102 and the dish 150 define a total cavity volume. As described above, the cover shell 102 defines a first cavity 10 and the dish 150 defines a second cavity 20. The first lid rim 104 defines no cavity. In some embodiments, the volume of the first cavity 10 defined by the cover shell 102 is less than the volume of the second cavity 20 defined by the dish 150. In some embodiments, the volume of the first cavity 10 defined by the cover shell 102 is greater than the volume of the second cavity 20 defined by the dish 150. In some embodiments, the volume of the first cavity 10 defined by the cover shell 102 is equal to the volume of the second cavity 20 defined by the dish 150.

In some embodiments, lid 100 is made of a first material and dish 150 is made of a second material, wherein the first material and the second material have different thermal expansion properties. That is, the lid 100 may have the tendency to change its shape, area, and volume in response to a change in temperature. In some embodiments, the lid 100 made from the first material and the dish 150 made from the second material expand or contract differently when subjected to changes in temperature. In some embodiments, the first material is a negative thermal expansion (NTE) material that shrinks when heated and expands when cooled. For example, the first material can be made of aluminum, polypropylene (plastic), or polystyrene (Styrofoam). In some embodiments, the second material is a compostable-type material such as wheat, sugarcane, balsa wood, palm leaf and paper, to name a few.

In some embodiments, lid 100 is made from a material that is susceptible to deformation when heated or cooled. When at least a portion of the lid is heated or cooled, thermal stresses in the lid 100 or dish 150 cause either the lid 100 or the dish 150 to expand or contract differently than the portion that was heated or cooled. In a preferred embodiment, the arrangement of the locking mechanism 110 provides sufficient vertical and horizontal spacing to allow for play between the lid 100 and the dish 150. The play can be selected such that deformations caused by changes in temperature typically encountered in food transport do not substantially affect the clamping pressure of the first lid rim 104 and the cover shell horizontal flange 120 around dish flange 152.

Figure 4:
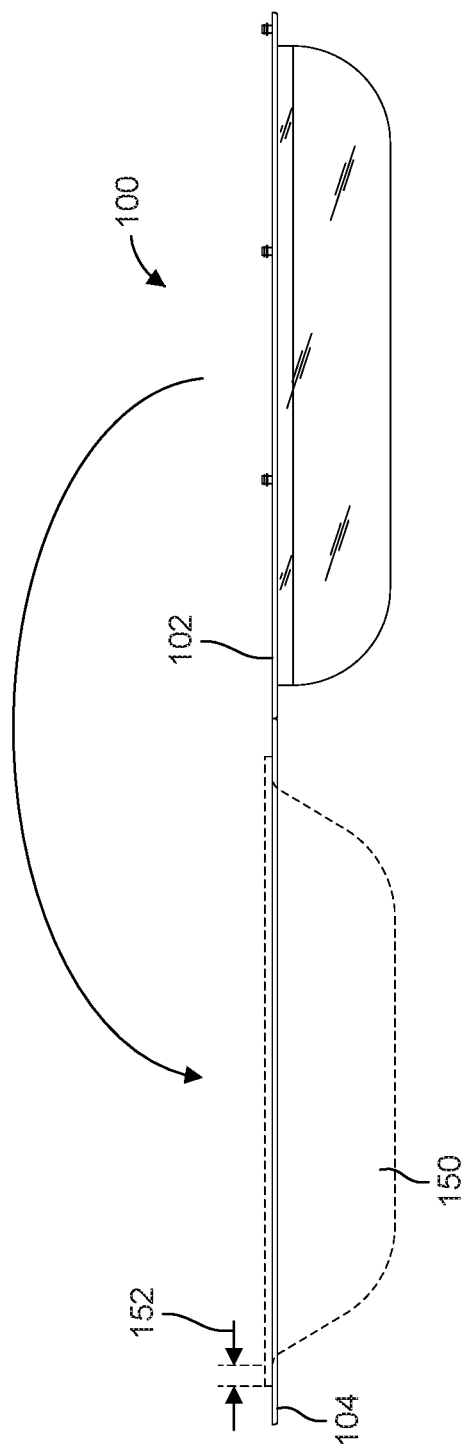
FIG. 4 is a side view of a lid in usage with a cover shell of the lid in the open position according to an example embodiment of the present invention.

FIG. 4 is a side view of a lid 100 in usage with a cover shell 102 of the lid in the open position according to an example embodiment of the present invention. As shown in FIG. 4, the first lid rim 104 is constructed to receive through the opening 108 (shown, e.g., in FIG. 1) dish 150 until dish flange 152 rests on the first lid rim 104. The first lid rim 104 provides a place for support of the dish 150 when the dish flange 152 rests on the first lid rim 104.

Figure 5:
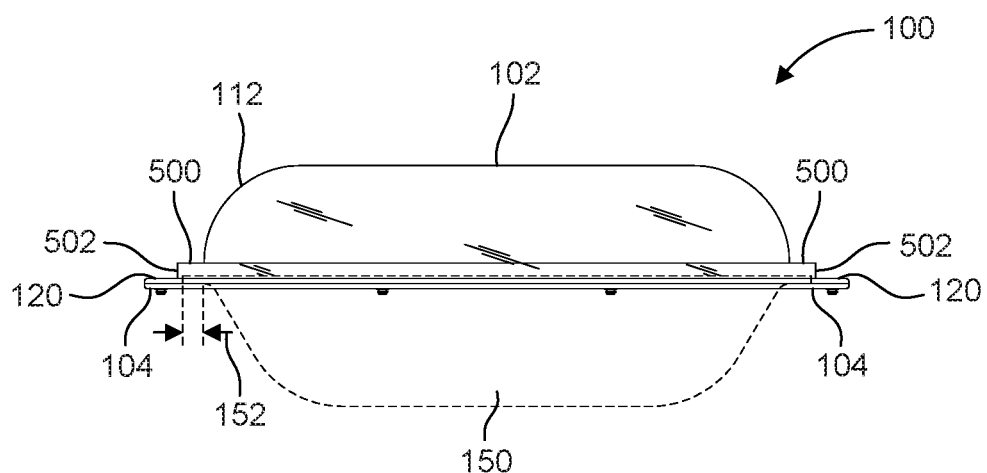
FIG. 5 is a front view of a lid in usage with a cover shell of the lid in the closed position according to an example embodiment of the present invention.

FIG. 5 is a front view of a lid 100 in usage with a cover shell 102 of the lid in the closed position according to an example embodiment of the present invention. As shown in FIG. 5, the first lid rim 104 is constructed to receive through the opening 108 (shown, e.g., in FIG. 1) dish 150 until dish flange 152 rests on the first lid rim 104. The first lid rim 104 provides a place for support of the dish 150 when the dish flange 152 rests on the first lid rim 104.

In some embodiments, cover shell 102 can include plateau shoulders 500 formed integrally with a downstanding lip 502 that together form a cavity. Plateau shoulders 500 can be formed to provide a cavity surrounding the dish flange 152. When the lid 100 is in closed position, the plateau shoulders 500, the downstanding lip 502, the cover shell horizontal flange 120 and the first lid rim 104 form a cavity. The hollow space of the cavity can vary. For example, in some embodiments, the hollow space of the cavity surrounding a dish flange 152 allows the dish flange 152 to move laterally up to a predetermined lateral amount and longitudinally up to a predetermined longitudinal amount (e.g., 1-2 mm). The plateau shoulders 500 and downstanding lip 502 are shown from different perspectives in FIGS. 5, 6, 7, 8 and 13. In some embodiments, the hollow space of the cavity surrounding the dish flange 152 substantially does not allow the dish flange 152 to move laterally or longitudinally at least, in part, because of the clamping pressure around dish flange 152.

Figure 6:
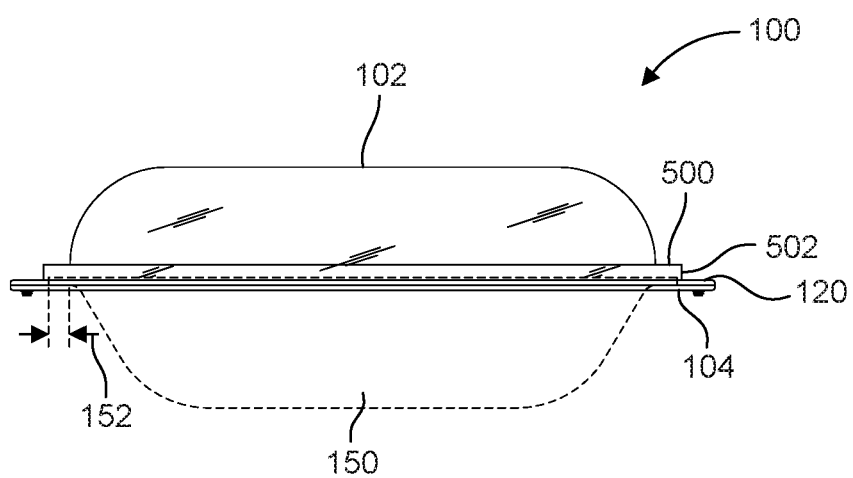
FIG. 6 is a rear view of a lid in usage with a cover shell of the lid in the closed position according to an example embodiment of the present invention.

FIG. 6 is a rear view of a lid 100 in usage with a cover shell 102 of the lid 100 in the closed position according to an example embodiment of the present invention.

Figure 7:
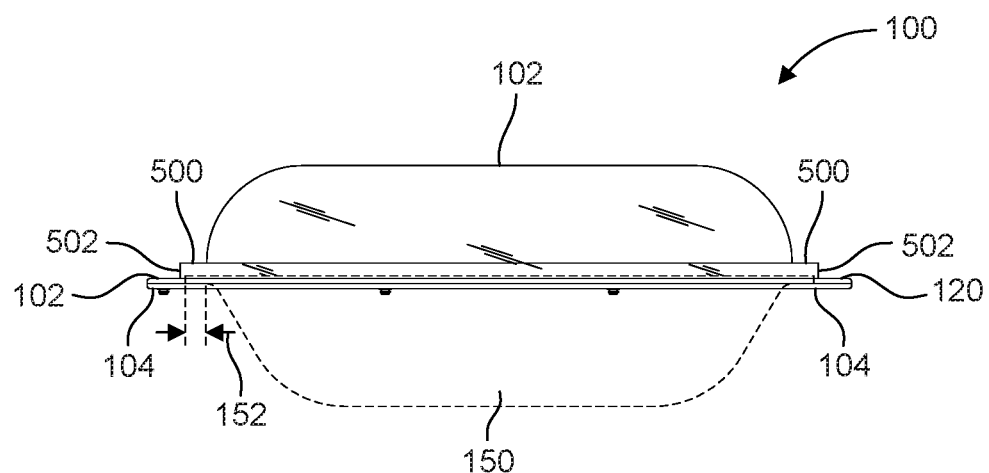
FIG. 7 is a right side view of a lid in usage with a cover shell of the lid in the closed position according to an example embodiment of the present invention.

FIG. 7 is a right side view of a lid 100 in usage with a cover shell 102 of the lid 100 in the closed position according to an example embodiment of the present invention.

Figure 8:
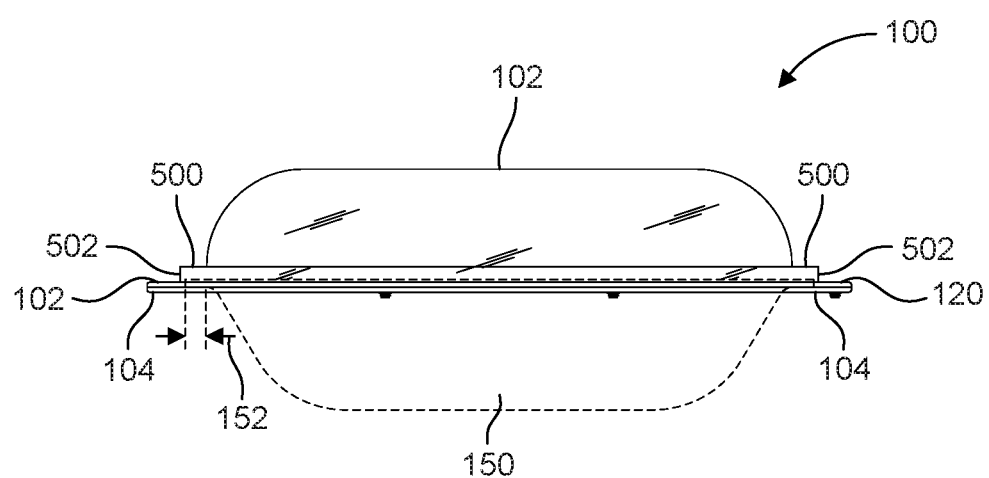
FIG. 8 is a left side view of a lid in usage with a cover shell of the lid in the closed position according to an example embodiment of the present invention.

FIG. 8 is a left side view of a lid 100 in usage with a cover shell 102 of the lid 100 in the closed position according to an example embodiment of the present invention.

Figure 9:
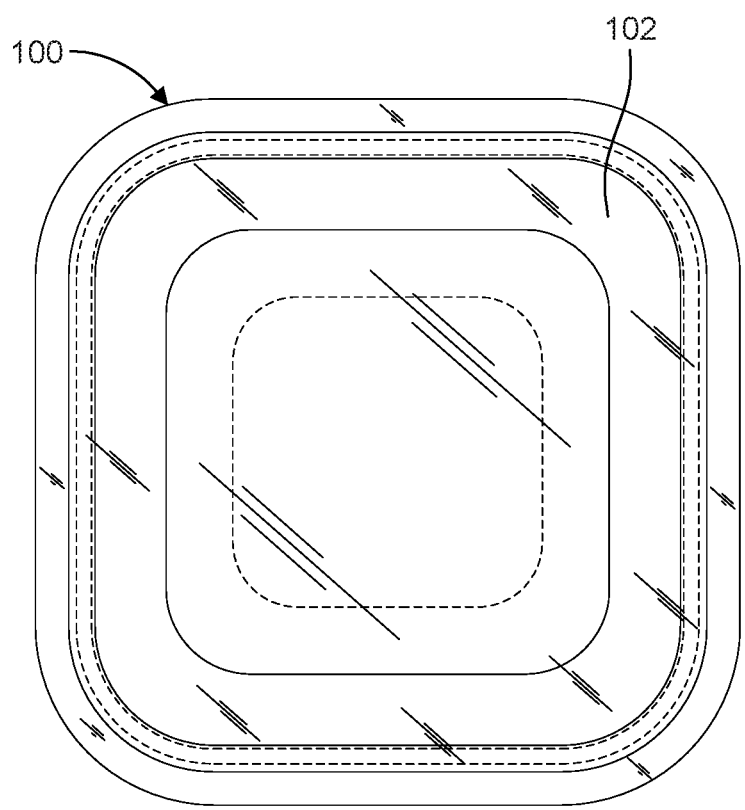
FIG. 9 is a top view of a lid in usage with a cover shell of the lid in the closed position according to an example embodiment of the present invention.

FIG. 9 is a top view of a lid 100 in usage with a cover shell 102 of the lid 100 in the closed position according to an example embodiment of the present invention.

Figure 10:
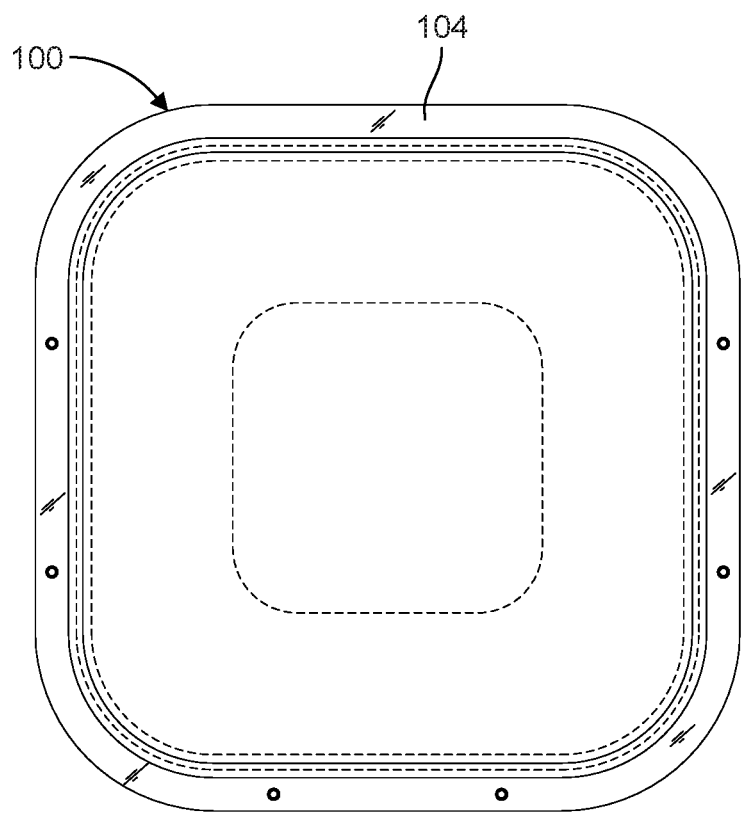
FIG. 10 is a bottom view of a lid in usage with a cover shell of the lid in the closed position according to an example embodiment of the present invention.

FIG. 10 is a bottom view of a lid 100 in usage with a cover shell of the lid 100 in the closed position according to an example embodiment of the present invention. The bottom surface of the first lid rim 104 can be seen in this view.

Figure 11:
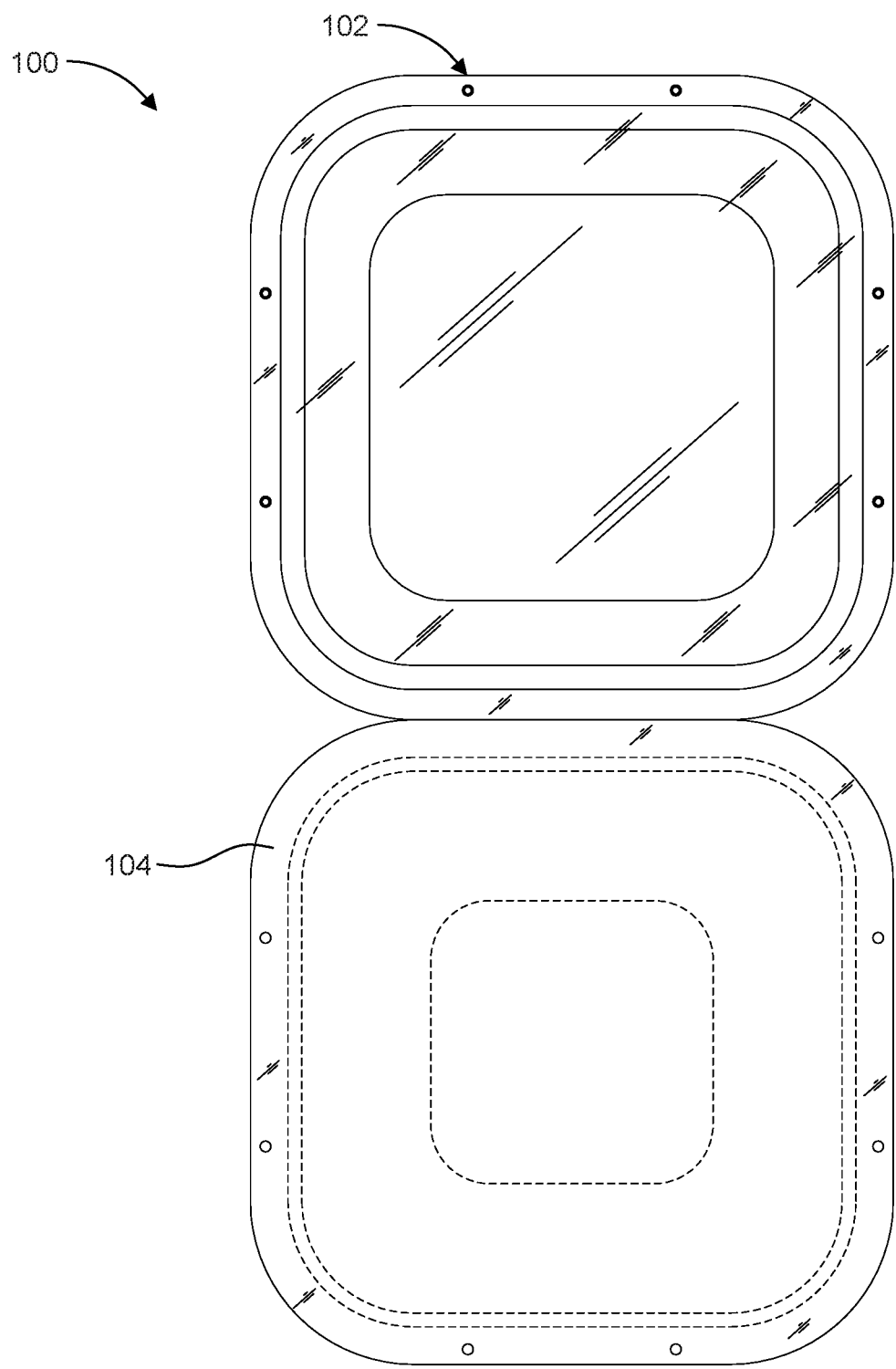
FIG. 11 is a top view of a lid with a cover shell of the lid in the open position according to an example embodiment of the present invention.

FIG. 11 is a top view of a lid 100 with a cover shell 102 of the lid 100 in the open position according to an example embodiment of the present invention.

Figure 12:
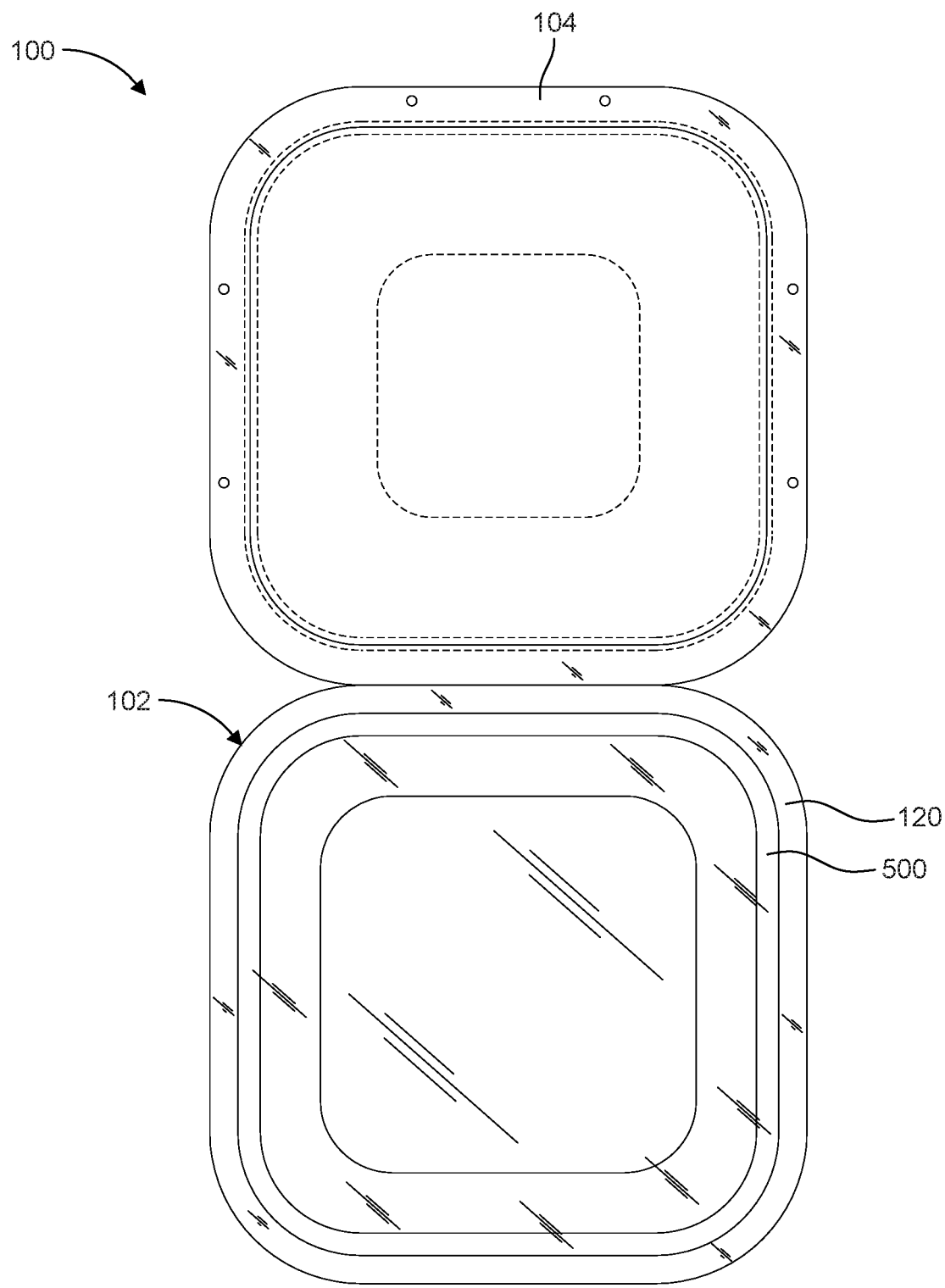
FIG. 12 is a bottom view of a lid with a cover shell of the lid in the open position according to an example embodiment of the present invention.

FIG. 12 is a bottom view of a lid 100 with a cover shell 102 of the lid 100 in the open position according to an example embodiment of the present invention.

Figure 13:
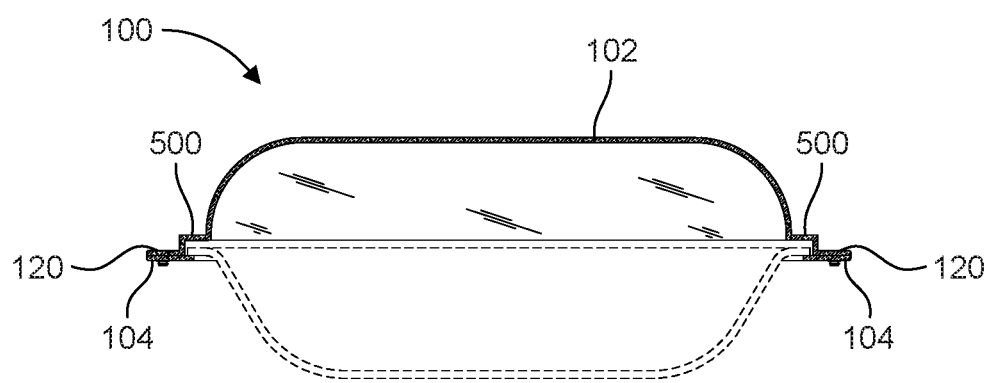
FIG. 13 is a front cross section of a lid in usage with a cover shell of the lid in the closed position according to an example embodiment of the present invention.

FIG. 13 is a front cross section of a lid 100 in usage with a cover shell 102 of the lid 100 in the closed position according to an example embodiment of the present invention.

Embodiment 2

Figure 14:
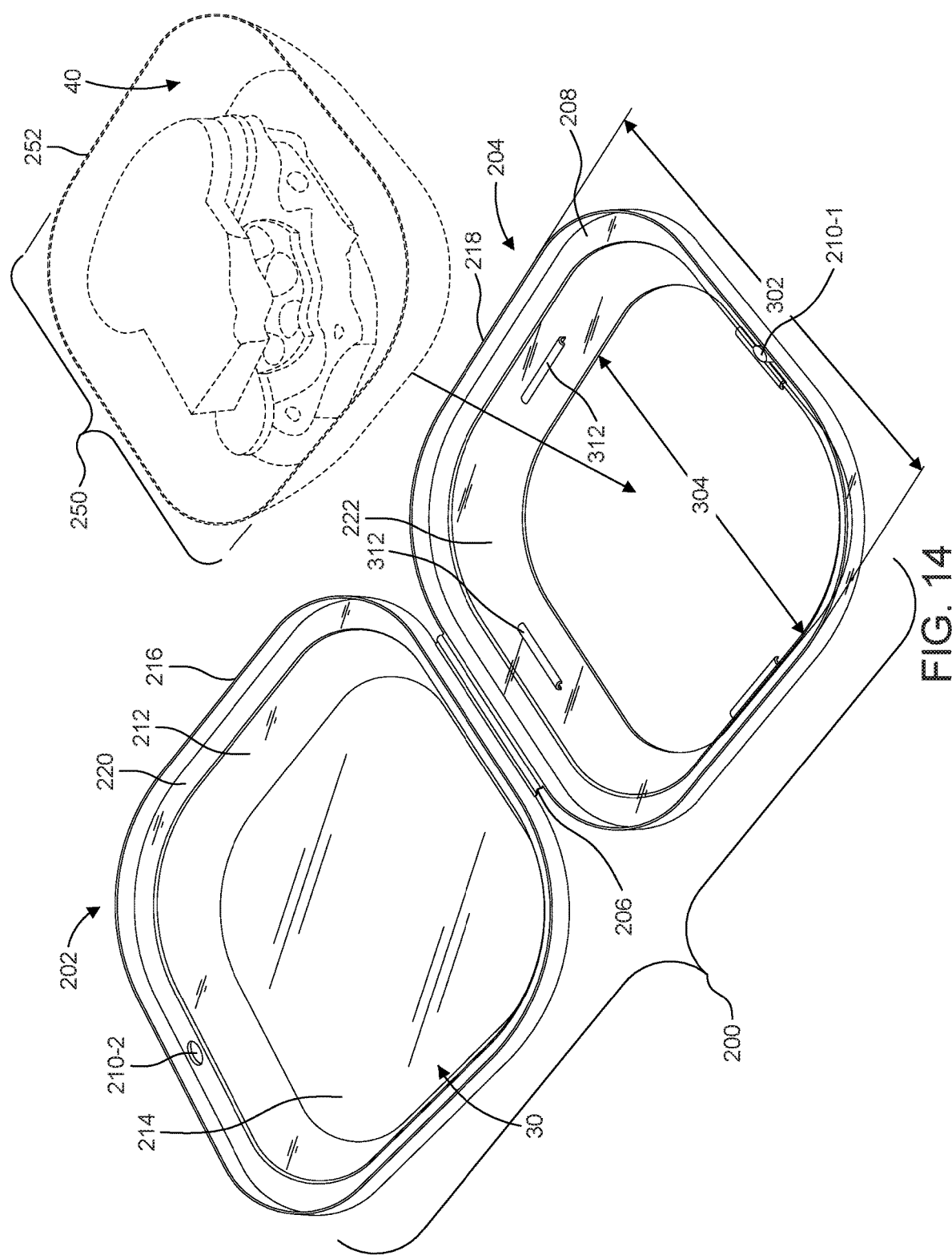
FIG. 14 is a perspective view of a lid according to an example embodiment of the present invention.

FIG. 14 is a perspective view of a lid 200 according to an example embodiment of the present invention. Lid 200 is constructed to outfit a dish 250.

Lid 200 includes a cover shell 202 and a clamp 204. Cover shell 202 includes one or more side walls 212. In some embodiments, the one or more side walls 212 can be arrayed and separated by plateaus. In yet another embodiment, the one or more side walls 212 can be continuous as shown in FIG. 14. Optionally, the walls can include ribs. The shape and volume of the cover shell 202 can vary depending on the use case.

Clamp 204 includes a portion of a hollowed solid that lies between one or two parallel planes cutting it, which is referred to herein as a frustum. In some embodiments, clamp 204 can include a pyramidal frustum portion, a conical frustum portion, or a spherical frustum portion. In other embodiments, clamp 204 can include any combination of a pyramidal frustum portion, a conical frustum portion, and a spherical frustum portion joined by one or more transitions. A frustum portion 222 of clamp 204 supports dish 250.

In an example embodiment, clamp 204 is formed to include a conical frustum portion of a hollow cone. In another example embodiment, clamp 204 is formed to include a pyramidal frustum portion of a hollow pyramid (e.g., a square pyramid, a rectangular pyramid, a rounded square pyramid, a rounded rectangular pyramid, and the like). In another example embodiment, clamp 204 is formed to include a spherical frustum portion of a hollow sphere.

As explained above, in some embodiments, clamp 204 includes any combination of the foregoing by including a transition section (not shown) between two frustum portions. A frustum portion 222 of clamp 204 depicted in FIG. 14 is formed in the shape of a rounded square pyramid frustum.

Clamp 204 includes a clamp top opening 302 and a clamp bottom opening 304. In the example embodiment depicted in FIG. 14, clamp 204 defines a clamp top opening 302 that has a shape of a rounded square and a clamp bottom opening 304 that also has a shape of a rounded square. It will be understood that in other embodiments, the clamp top opening 302 and clamp bottom opening 304 take on other shapes. For example, clamp top opening 302 and clamp bottom opening 304 can be formed in a radial shape, oval shape, round shape, or rounded shape, or a combination thereof. In a preferred embodiment, the shape of the clamp top opening 302 and the shape of clamp bottom opening 304 generally conform to the shape of a portion of a dish 250 that is inserted through clamp 204.

The cover shell 202 and clamp 204 are pivotally interconnected by a hinge member 206. In some embodiments, the hinge member 206 is formed integrally with the cover shell 202 and clamp 204. In other words, lid 200 can be a one piece molded construction.

In an alternative embodiment, cover shell 202 and clamp 204 can be formed as separate components. In other words, lid 200 can be a two piece molded construction.

In an example embodiment, the cover shell 202 has at least one portion having a shape that generally corresponds to a shape of the clamp 204. For example, as shown in FIG. 14, the shape of the cover shell 202 is formed by side walls 212 which extend inwardly from a cover shell horizontal plateau 220 to a cover shell top 214. Clamp 204 has a clamp horizontal plateau 208 corresponding to the shape of the cover shell horizontal plateau 220.

Cover shell 202 can include a downstanding lip 216 extending from cover shell horizontal plateau 220. Clamp 204 can include an upstanding lip 218 extending from clamp horizontal plateau 208. When cover shell 202 is closed over clamp 204, downstanding lip 216 operates as a skirt surrounding the upstanding lip 218.

When the cover shell 202 is closed over clamp 204, a surface of cover shell horizontal plateau 220 substantially abuts the clamp horizontal plateau 208. As used herein, the term "abut" means to (i) touch or (ii) be next to but not necessarily touch.

FIG. 14 also depicts a dish 250. It should be understood that the dish need not form part of the lid 200. In other words, in one embodiment, lid 200 is manufactured independently of dish 250. This allows lid 200 and dish 250 to be manufactured by the same or different manufacturers. Alternatively, in another embodiment, lid 200 and dish 250 are manufactured by the same manufacturer.

In some embodiments, dish 250 has a dish flange such as the flange describe above in connection with FIG. 1 (FIG. 1, dish flange 152). In some embodiments, dish 250 has no dish flange and instead terminates at a dish rim 252 as shown in FIG. 14. Dish rim 252 can take various forms, such as a t-shaped rim, bead rim, an overhanging rim, a broad flat-topped rim, to name a few. In some embodiments, clamp 204 further includes one or more dish couplers 312.

Figure 15A:
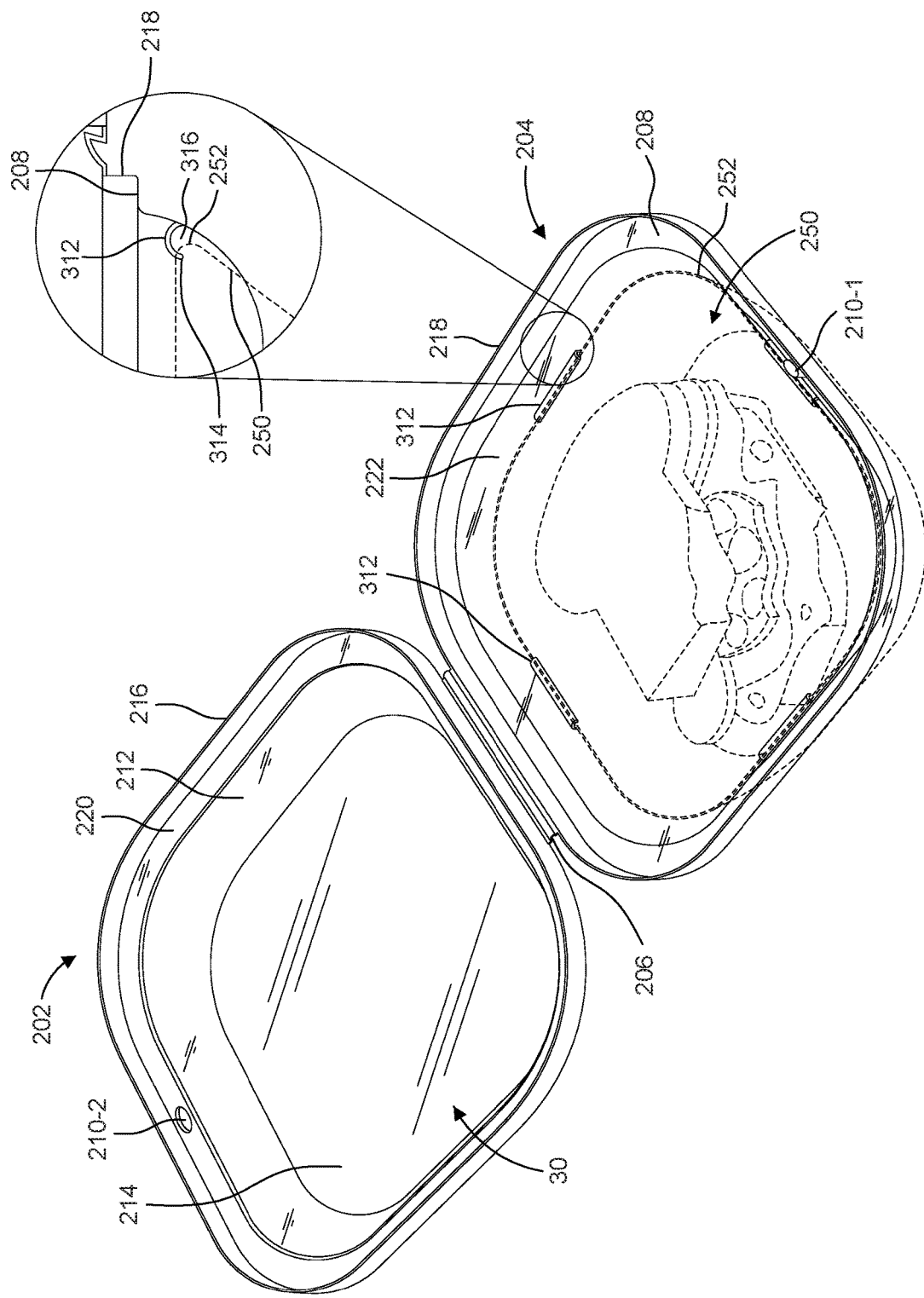
FIG. 15A is a perspective view of a lid in usage with a cover shell of the lid in the open position according to an example embodiment of the present invention.

FIG. 15A is a perspective view of a lid 200 in usage with a cover shell 202 of the lid in the open position according to an example embodiment of the present invention. As explained above, in some embodiments, clamp 204 further includes one or more dish couplers 312. Dish coupler 312 is constructed to releasably engage with dish 250. Dish coupler includes a dish coupler outer lip 314 and a dish coupler trough 316. In an example embodiment, dish 250 is fed through clamp top opening 302 and clamp bottom opening 304 until a dish rim 252 of dish 250 slides past dish coupler outer lip 314 of dish coupler 312 and rests within a dish coupler trough 316. In the example embodiment shown in FIG. 15A, four dish couplers 312 are shown. However, it should be understood that this embodiment is merely one example embodiment. Dish coupler 312 can be a continuous dish coupler around the inner surface of frustum portion 222 (i.e., a single dish coupler). It should also be understood that the dish coupler 312 can be shaped differently to accommodate one or more types of dish rims or flanges.

When the dish coupler 312 is engaged with dish 250, dish coupler 312 prevents clamp 204 and dish 250 from disengaging. In other words, when the clamp 204 is engaged with dish 250 using dish coupler 312, the inner surface of frustum portion 222 remains adjacent to a corresponding portion of the outer surface of dish 250. Clamp bottom opening 304 thus remains raised above a base (e.g., table) upon which dish 250 rests upon when dish 250 is engaged with clamp 204.

Once engaged, dish 250 can be disengaged from the dish coupler 312 by placing sufficient pressure (e.g., using a thumb) onto the clamp horizontal plateau 208 and upstanding lip 218 and/or the inner surface of the frustum portion 222 of clamp 204. The pressure will raise dish coupler outer lip 314 and dish coupler trough 316 away from dish rim 252 to release the dish 250. In some embodiments with multiple dish couplers 312, it may be necessary to perform this step at different locations on clamp 204 in order to release the dish 250.

In some embodiments, a dish coupler 312 can be integrally formed on the frustum portion 222 as one or more protrusions facing inwardly. In an example implementation, dish coupler 312 need not include a dish coupler outer lip 314 and a dish coupler trough 316. Dish coupler 312 having the form of such a protrusion releasably engages the dish 250.

Figure 15B:
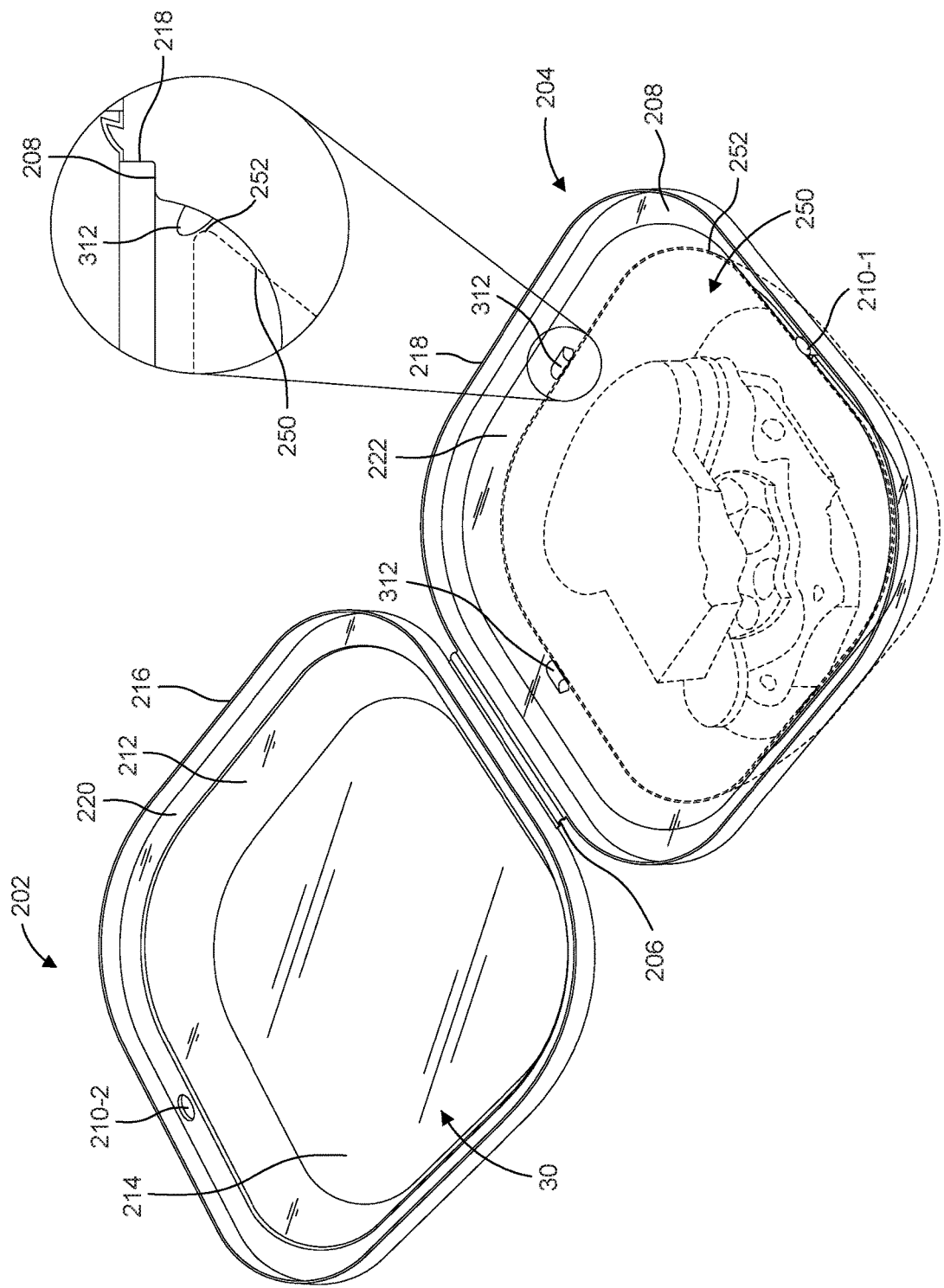
FIG. 15B is a perspective view of a lid in usage with a cover shell of the lid in the open position according to an example embodiment of the present invention.

FIG. 15B a perspective view of a lid 200 in usage with a cover shell 202 of the lid in the open position according to an example embodiment of the present invention. In this example side view, there is shown a dish coupler 312 having the form of a protrusion. It should be understood dish coupler can be in the form of any now known or future developed protrusion that can be used to releasably engage a dish 250 with clamp 204. For example, such protrusion can be defined by a convexity, protuberance, nose, projection, beak, crest or other similar shape protruding towards the inside of clamp 204. Such shapes also can be defined by a circular arc or sector, or by an elliptical portion or similar curve.

In some embodiments, dish coupler 312 is integrally formed with clamp 204. The expression "integrally formed" as used herein means formed as a single piece or a structural integration of separate components.

As shown in FIGS. 14, 15A and 15B, clamp 204 is constructed to receive, through clamp top opening 302 and clamp bottom opening 304, dish 250 until a portion of dish 250 rests on frustum portion 222 of clamp 204. In other words, clamp 204 provides a support for dish 250 when a portion of dish 250 rests on clamp 204 and dish coupler 312 on frustum portion 222 is releasably engaged with dish rim 252 of dish 250.

Figure 16:
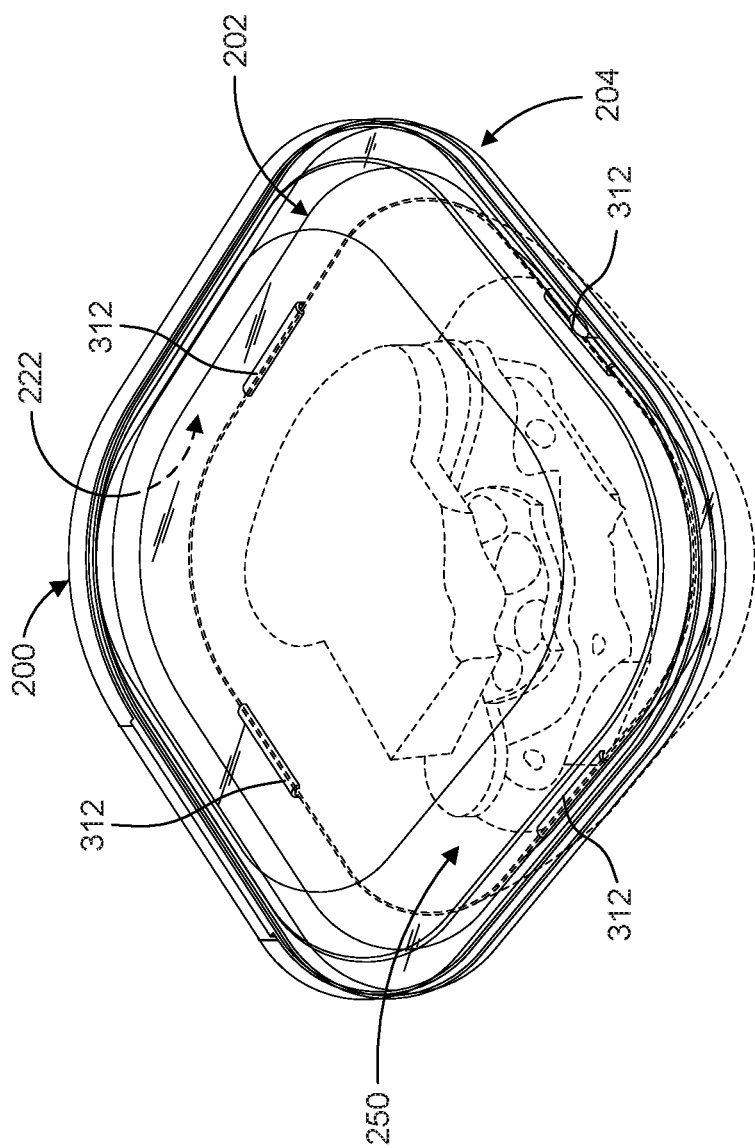
FIG. 16 depicts a perspective view of a lid in usage when cover of the lid is detachably secured to clamp in accordance with an example embodiment of the present invention.

FIG. 16 depicts a perspective view of a lid 200 in usage when cover shell 202 of the lid 200 is detachably secured to clamp 204, in accordance with an embodiment of the present invention. The dish 250 becomes seated on frustum portion 222 of clamp 204 and releasably engaged with dish coupler 312 of clamp 204. In this embodiment, clamp 204 secures the dish 250 by the application of pressure generated by dish coupler 312 when the dish 250 are releasably engaged.

Referring again to FIGS. 14, 15A and 15B, in some embodiments, the cover shell 202 is releasably secured to the clamp 204 using a locking mechanism 210. In an example embodiment, the locking mechanism 210 includes male element 210-1 formed on clamp horizontal plateau 208 and adapted to be received in female element 210-2 (e.g., bore) formed on a corresponding location on cover shell horizontal plateau 220 of cover shell 202. The male element 210-1 and female element 210-2 are constructed to be in snap engagement to securely lock the cover shell 202 to clamp 204. It should be understood that the locking mechanism 210 depicted in FIGS. 14, 15A and 15B is merely an example. Lid 200 can include another known or future known locking mechanism that releasably couples cover shell 202 and clamp 204. Such other interlocking mechanism would still be within the scope of the invention (e.g., a tab-interlocking mechanism, a latch, a fastener, a re-sealable zipper interlocking mechanism, and the like).

As explained above, environmental elements (such as light, relative humidity, and temperature) affect compostable and polypropylene packaging differently. Similarly, such elements affect different parts of packaging made from the same material. One technical problem solved by aspects of the present invention relates to minimizing the effect changes in the elements of the environment have on different parts of packaging. Changes in the elements of the environment can affect the mechanical connections of conventional lid/dish combinations. In some cases the lids either pop off the dish and in some cases they become more difficult to take off.

The solution is to provide a lid that holds dish 250 in place such that changes is the dimensions of the lid and dish caused by the elements do not affect the general stability of the coupling of dish 250 and clamp 204. According in some embodiments, the engagement of a dish rim 252 and clamp 204 using dish coupler 312 is sufficient to prevent the dish from separating while allowing the dimensions of the lid 200 and dish 250 to expand, contract or otherwise deform differently. Aspects of dish 250 and lid 200 that can affect the engagement of dish 250 and lid 200 include the surface deformation of the dish 250; the arc and elasticity of dish coupler 312, the dimensions of dish rim 252, and the like. Changes to these elements to account for shape, dimensions of lid 200 and dish 250 can be made and still be within the scope of the present invention. For example, rather than implement a dish coupler 312 that is arced, dish coupler 312 can be substantially flat.

In one example embodiment, the elements of lid 200 are formed from the same material as dish 250. The cooperation of the cover shell horizontal plateau 220 and the clamp 204 when housing a dish 250 are not affected by differences in deformations of the lid 200 and dish 250 that are subject to the same elements of the environment. In another example embodiment, the elements of lid 200 are formed from a different material than dish 250. The cooperation of the dish 250 and clamp 204 when housing a dish 250 also are not substantially affected by differences in deformations of the lid 200 and dish 250 that are subject to the same elements of the environment.

Dish 250 may have an irregular shape. For example, the shape of dish rim 252 may not perfectly correspond to the shape of frustum portion 222. To account for this, in some embodiments, dish coupler 312 can be constructed to have an arc (i.e., forming dish coupler trough 316) that accounts for variations in the topology of the dish rim 252. It should be understood that dish coupler 312 need not be arc shaped as depicted in FIG. 15A or 15B. Dish coupler 312 can be constructed in the form of another shape (e.g., a protrusion having a substantially flat surface, downward sloping tab, and the like).

In some embodiments, the dish coupler 312 is continuous around frustum portion 222 of clamp 204 and the engagement of dish coupler trough 316 with dish rim 252 forms a seal sufficient to resist the passage of material stored within dish 250 between the cavity of dish 250 and dish coupler trough 316.

In some embodiments, a seal is formed slightly below dish coupler 312 (e.g., 1-3 mm below the formation of the dish coupler 312 on frustum portion 222). In this embodiment, the seal can serve to not only to resist the passage of material stored within dish 250 between the cavity of dish 250 and the seal, but also provide inward pressure against the dish sidewall to cause a more secure coupling of dish coupler 312 and dish rim 252 by creating an additional inward pressure from dish coupler 312 against dish rim 252.

The combination of the cover shell 202 a portion of clamp 204 and the dish 250 define a total cavity volume. As described above, the cover shell 202 defines a first cavity 30 and the dish 250 and portion of clamp 204 above dish rim 252 to approximately the level of clamp horizontal plateau 208 define a second cavity 40. In some embodiments, the volume of the first cavity 30 is less than the volume of the second cavity 40. In some embodiments, the volume of the first cavity 30 is greater than the volume of the second cavity 40. In some embodiments, the volume of the first cavity 30 is equal to the volume of the second cavity 40.

In some embodiments, lid 200 is made of a first material and dish 250 is made of a second material, wherein the first material and the second material have different thermal expansion properties. That is, the lid 200 can have the tendency to change its shape, area, and volume in response to a change in temperature. In some embodiments, the lid 200 made from the first material and the dish 250 made from the second material expand or contract differently when subjected to changes in temperature. In some embodiments, the first material is a negative thermal expansion (NTE) material that shrinks when heated and expands when cooled. For example, the first material can be made of aluminum, polypropylene (plastic), or polystyrene (Styrofoam). In some embodiments, the second material is a compostable-type material such as wheat, sugarcane, balsa wood, palm leaf and paper, to name a few.

In some embodiments, lid 200 is made from a material that is susceptible to deformation when heated or cooled. When at least a portion of the lid is heated or cooled, thermal stresses in the lid 200 or dish 250, causing either the lid 200 or the dish 250 to thus expand or contract differently than the portion that was heated or cooled.

Figure 17:
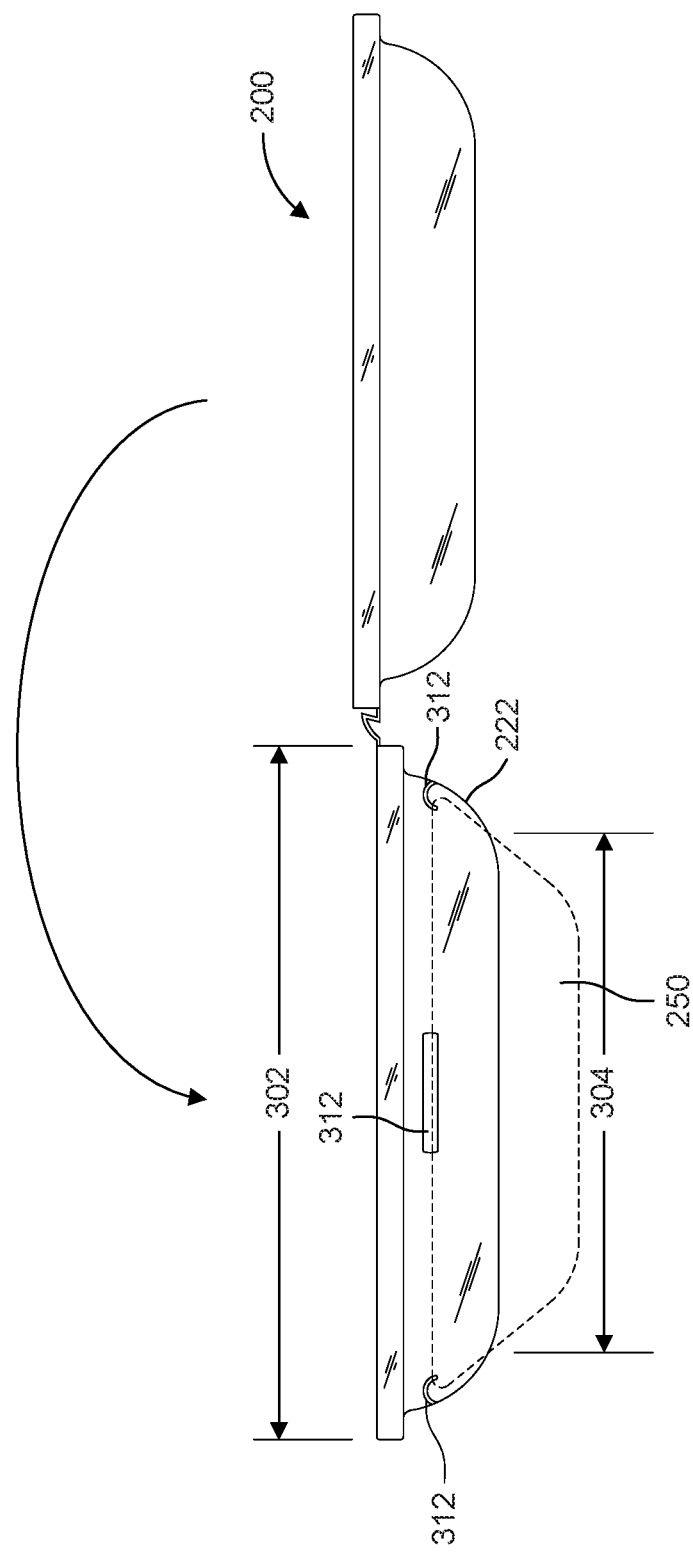
FIG. 17 is a side view of a lid in usage with a cover shell of the lid in the open position according to an example embodiment of the present invention.

FIG. 17 a side view of a lid 200 in usage with a cover shell 202 of the lid in the open position according to an example embodiment of the present invention. As shown in FIG. 17, the clamp 204 is constructed to receive dish 250 through clamp top opening 302 and clamp bottom opening 304 until dish 250 rests on the inner surface of frustum portion 222 of clamp 204 and is releasably secured by dish coupler 312. The frustum portion 222 of clamp 204 provides a place for support of the dish 250 when the dish 250 rests on the frustum portion 222.

Figure 18:
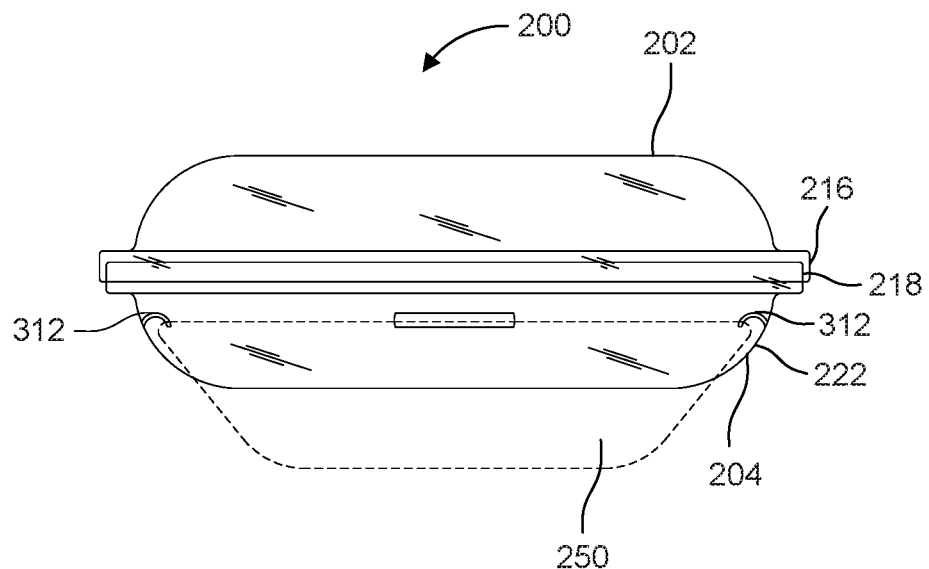
FIG. 18 is a front view of a lid in usage with a cover shell of the lid in the closed position according to an example embodiment of the present invention.

FIG. 18 is a front view of a lid 200 in usage with a cover shell of the lid in the closed position according to an example embodiment of the present invention. As shown in FIG. 18, clamp 204 is constructed to receive dish 250 through clamp top opening 302 and clamp bottom opening 304 until dish 250 rests on the frustum portion 222. The frustum portion 222 of clamp 204 provides a place for support of the dish 250 when the dish 250 rests on the frustum portion 222 and engages with dish coupler 312.

Figure 19:
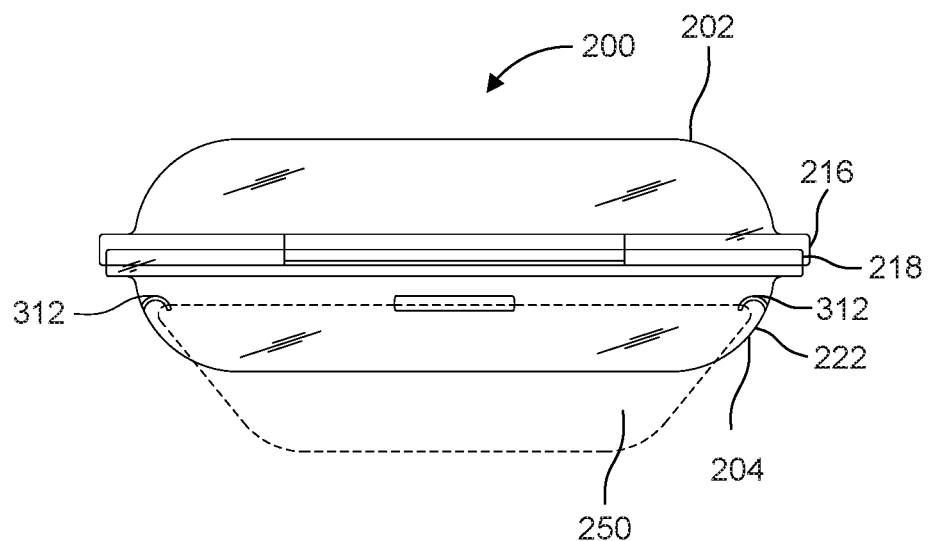
FIG. 19 is a rear view of a lid in usage with a cover shell of the lid in the closed position according to an example embodiment of the present invention.

FIG. 19 is a rear view of a lid 200 in usage with a cover shell 202 of the lid in the closed position according to an example embodiment of the present invention.

Figure 20:
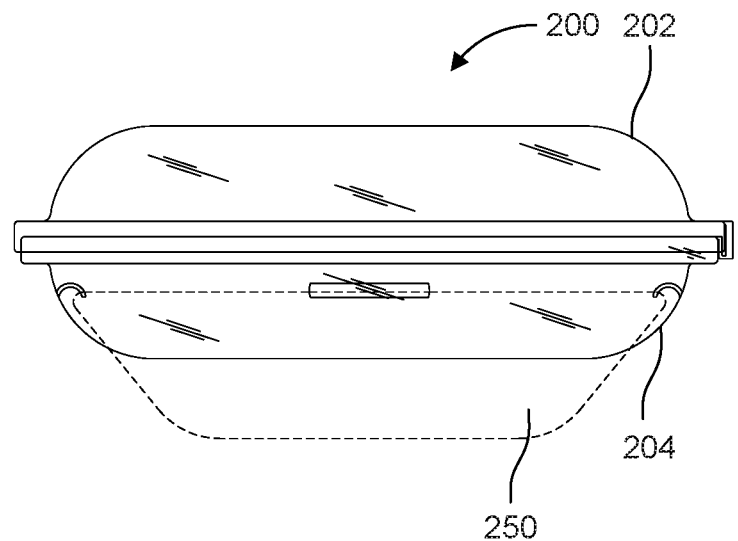
FIG. 20 is a right side view of a lid in usage with a cover shell of the lid in the closed position according to an example embodiment of the present invention.

FIG. 20 is a right side view of a lid 200 in usage with a cover shell 202 of the lid in the closed position according to an example embodiment of the present invention.

Figure 21:
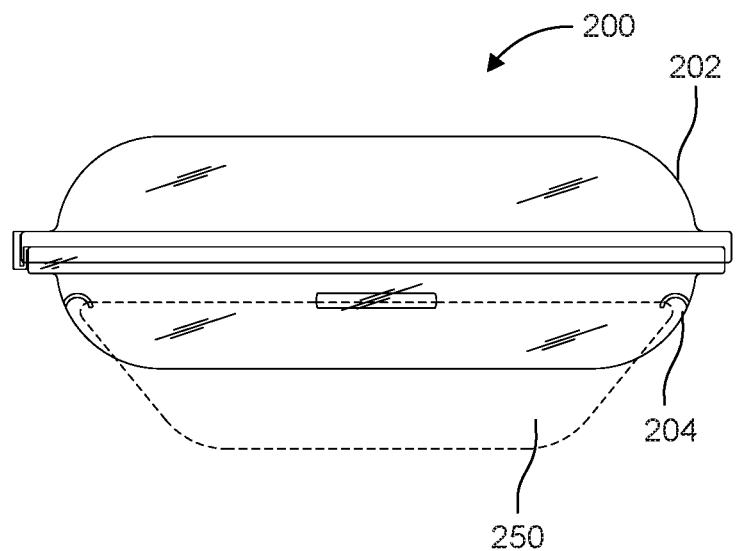
FIG. 21 is a left side view of a lid in usage with a cover shell of the lid in the closed position according to an example embodiment of the present invention.

FIG. 21 is a left side view of a lid 200 in usage with a cover shell 202 of the lid in the closed position according to an example embodiment of the present invention.

Figure 22:
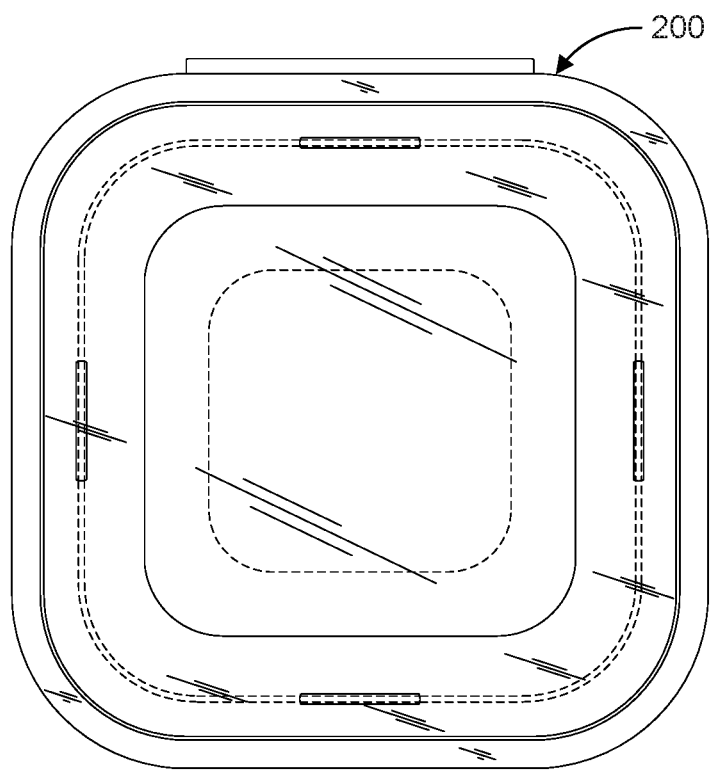
FIG. 22 is a top view of a lid in usage with a cover shell of the lid in the closed position according to an example embodiment of the present invention.

FIG. 22 is a top view of a lid 200 in usage with a cover shell 202 of the lid in the closed position according to an example embodiment of the present invention.

Figure 23:
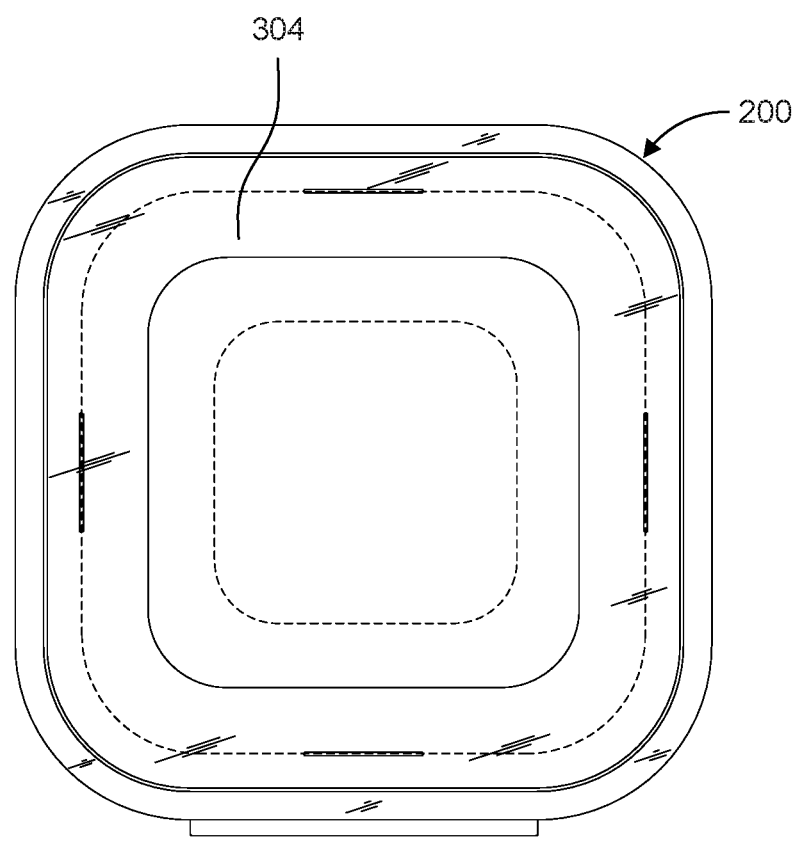
FIG. 23 is a bottom view of a lid in usage with a cover shell of the lid in the closed position according to an example embodiment of the present invention.

FIG. 23 is a bottom view of a lid 200 in usage with a cover shell of the lid in the closed position, according to an example embodiment of the present invention. The outside surface of the clamp 204 can be seen from this view.

Figure 24:
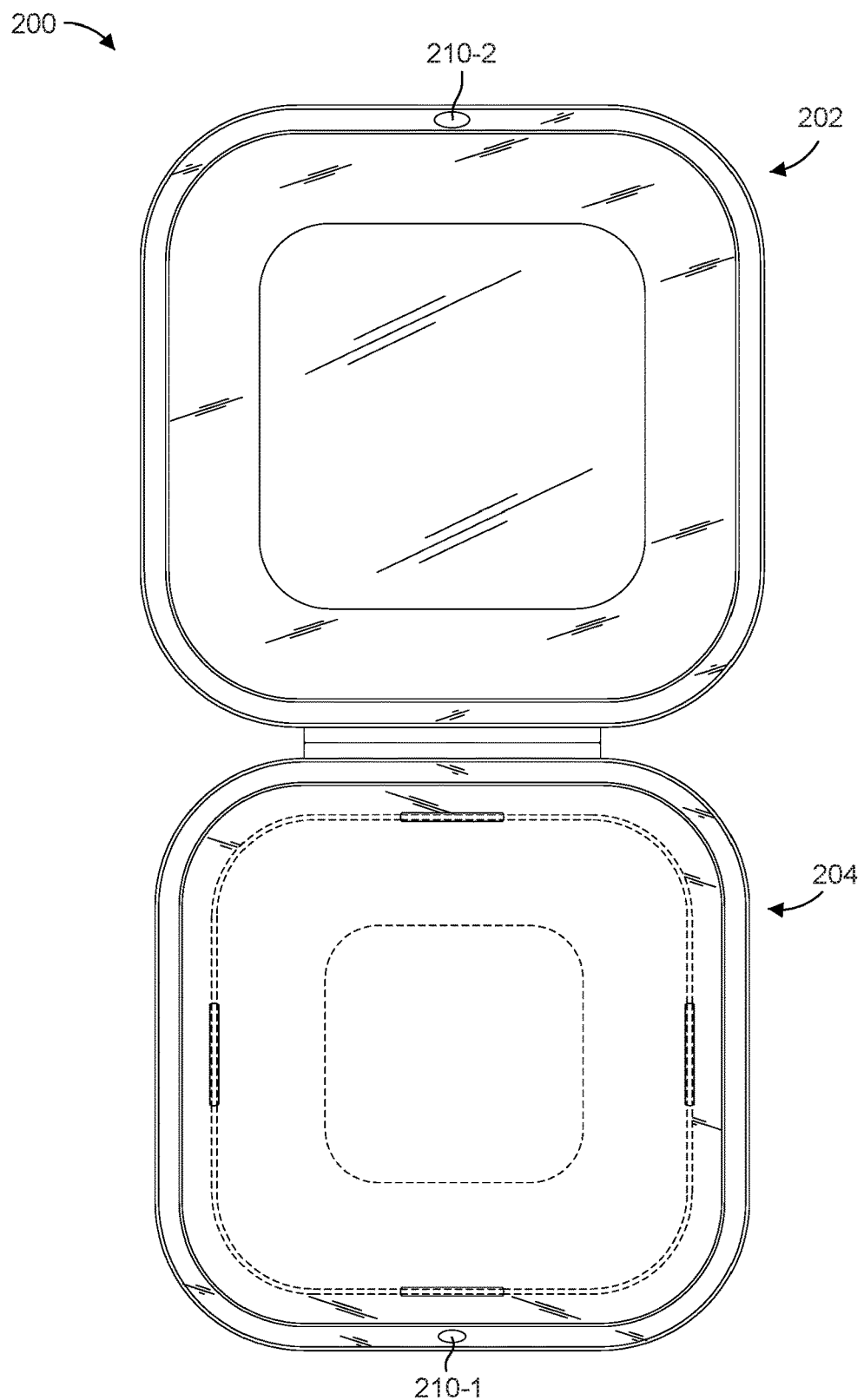
FIG. 24 is a top view of a lid with a cover shell of the lid in the open position according to an example embodiment of the present invention.

FIG. 24 is a top view of a lid with a cover shell 202 of the lid 200 in the open position according to an example embodiment of the present invention. Referring again to FIGS. 14, 15A and 15B as well as FIG. 24, in some embodiments, the cover shell 202 is releasably secured to the clamp 204 using a locking mechanism 210. FIG. 23 depicts male element 210-1 formed on clamp horizontal plateau 208 and adapted to be received in female element 210-2 (e.g., bore) formed on a corresponding location on cover shell horizontal plateau 220 of cover shell 202. The male element 210-1 and female element 210-2 are constructed to be in snap engagement to securely lock the cover shell 202 to clamp 204. It should be understood that the locking mechanism 210 depicted in FIGS. 14, 15 and 24 is merely an example.

Figure 25:
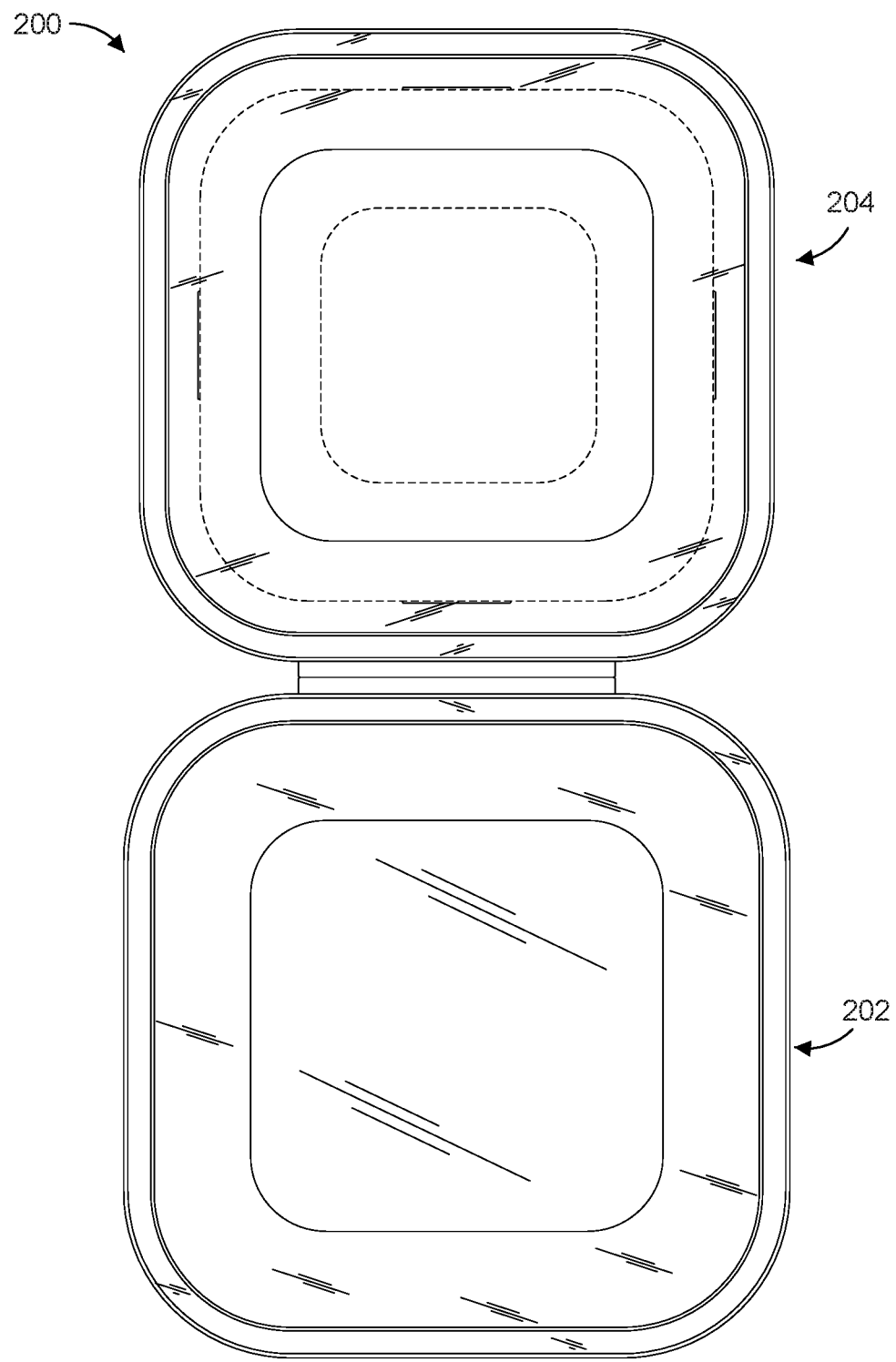
FIG. 25 is a bottom view of a lid with a cover shell of the lid in the open position according to an example embodiment of the present invention.

FIG. 25 is a bottom view of a lid 200 with a cover shell 202 of the lid in the open position according to an example embodiment of the present invention.

Figure 26:
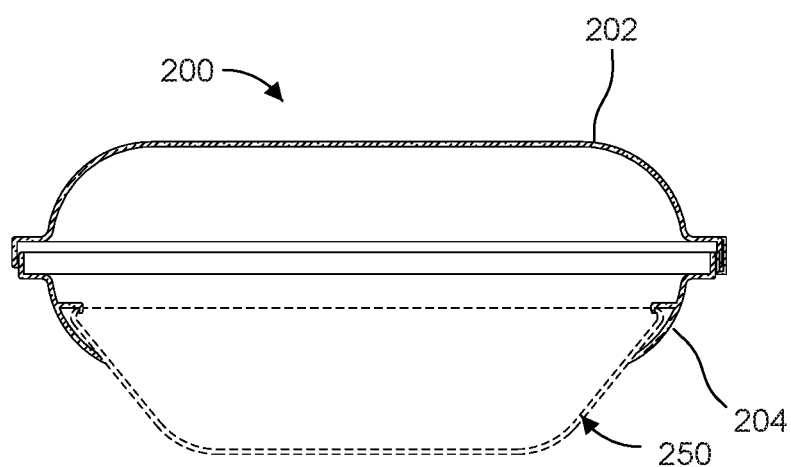
FIG. 26 is a front cross section of a lid in usage with a cover shell of the lid in the closed position according to an embodiment of the present invention.

FIG. 26 is a front cross section of a lid 200 in usage with a cover shell 202 of the lid in the closed position according to an example embodiment of the present invention.

Embodiment 3

Figure 27:
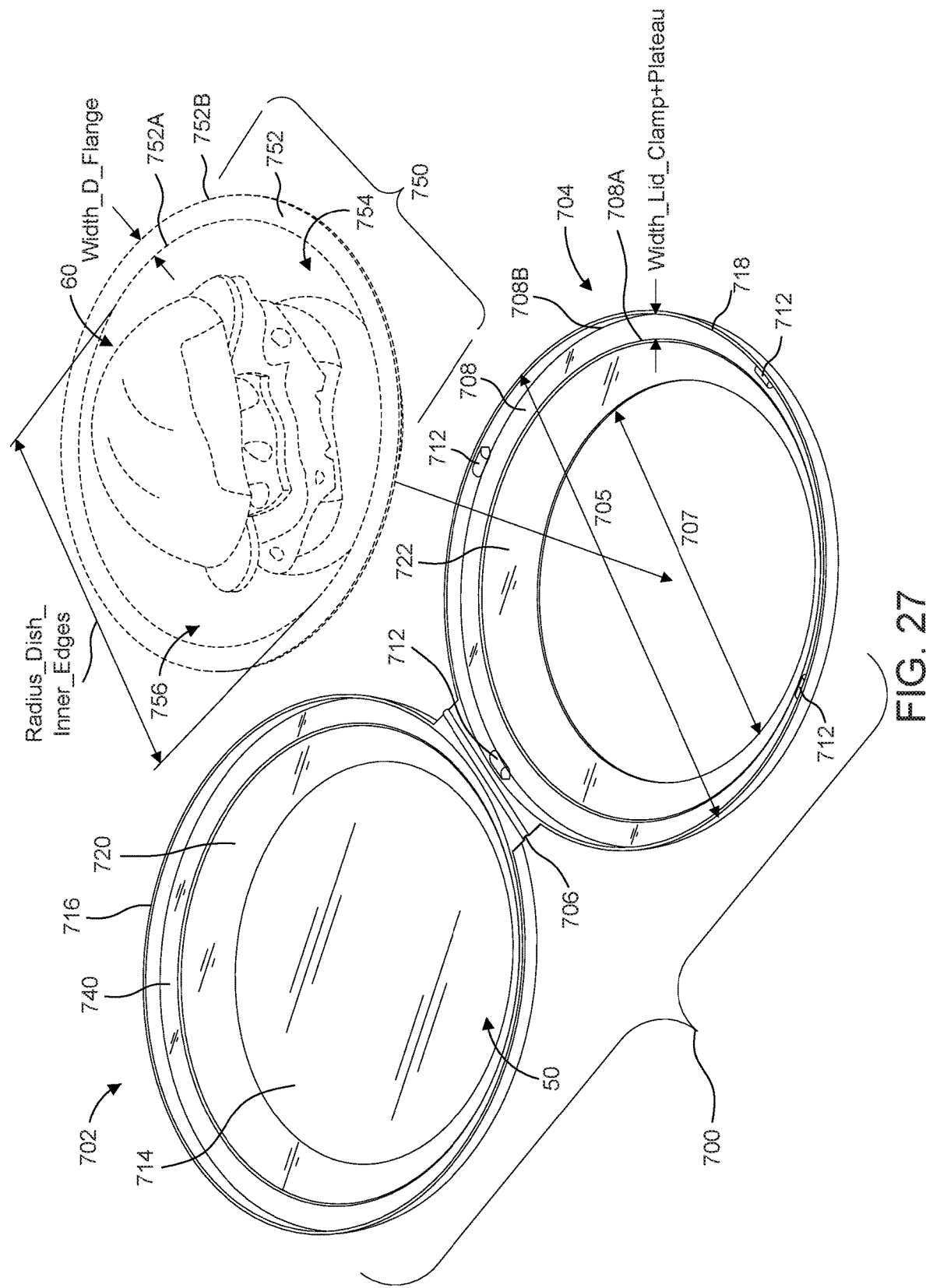
FIG. 27 is a perspective view of a lid according to an embodiment of the present invention.

FIG. 27 is a perspective view of a lid 700 according to an embodiment of the present invention. Lid 700 is constructed to outfit a dish 750.

Lid 700 includes a cover shell 702 and a clamp 704. Cover shell 702 includes one or more side walls 720. In some embodiments, the one or more side walls 720 can be arrayed and separated by plateaus. In yet another embodiment, the one or more side walls can be continuous as shown in FIG. 27. Optionally, the walls can include ribs. The shape and volume of the cover shell 702 can vary depending on the use case.

Clamp 704 includes a portion of a hollowed solid that lies between one or two parallel planes cutting it, which as explained above is referred to herein as a frustum. In some embodiments, clamp 704 can include a pyramidal frustum portion, a conical frustum portion, or a spherical frustum portion. In other embodiments, clamp 704 can include any combination of a pyramidal frustum portion, a conical frustum portion, and a spherical frustum portion joined by one or more transitions. In this embodiment, a frustum portion 722 and a clamp horizontal plateau 708 of Clamp 704 support dish 750.

In an example embodiment, clamp 704 is formed to include a spherical frustum portion of a hollow sphere. In another example embodiment, clamp 704 is formed to include a pyramidal frustum portion of a hollow pyramid (e.g., a square pyramid, a rectangular pyramid, a rounded square pyramid, a rounded rectangular pyramid, and the like). In another example embodiment, for example, clamp 704 is formed to include a conical frustum portion of a hollow cone.

As explained above, in some embodiments, clamp 704 includes any combination of the foregoing by including a transition section (not shown) between two frustum portions. A frustum portion 722 of clamp 704 depicted in FIG. 27 is formed in the shape of a spherical frustum.

Clamp 704 includes a clamp top opening 705 and a clamp bottom opening 707. In the example embodiment depicted in FIG. 27, clamp 704 defines a clamp top opening 705 that has a round shape and a clamp bottom opening 707 that also has a round shape. It will be understood that in other embodiments, the clamp top opening 705 and clamp bottom opening 707 take on other shapes. For example, clamp top opening 705 and clamp bottom opening 707 can be formed in a radial shape, oval shape, round shape, rounded square, or rounded shape, or a combination thereof. In a preferred embodiment, the shape of the clamp top opening 705 and the shape of clamp bottom opening 707 generally conform to the shape of a portion of a dish 750 that is inserted through clamp 704.

The cover shell 702 and clamp 704 are pivotally interconnected by a hinge member 706. In some embodiments, the hinge member 706 is formed integrally with the cover shell 702 and clamp 704. In other words, lid 700 can be a one piece molded construction.

In an alternative embodiment, cover shell 702 and clamp 704 can be formed as separate components. In other words, lid 700 can be a two piece molded construction.

In an example embodiment, the cover shell 702 has at least one portion having a shape that generally corresponds to a shape of the clamp 704. For example, as shown in FIG. 27, the shape of the cover shell 702 is formed by one or more side walls 720 which extend inwardly from a cover shell horizontal plateau 740 to a cover shell top 714. Clamp 704 has a clamp horizontal plateau 708 corresponding to the shape of the cover shell horizontal plateau 740. The clamp horizontal plateau 708 has an inner edge 708A and an outer edge 708B defining a clamp horizontal plateau 708 width (Width_Lid_Clamp_Plateau).

Cover shell 702 can include a downstanding lip 716 extending from cover shell horizontal plateau 740. Clamp 704 can include an upstanding lip 718 extending from clamp horizontal plateau 708. When cover shell 702 is closed over clamp 704, downstanding lip 716 operates as a skirt surrounding upstanding lip 718.

When the cover shell 702 is closed over clamp 704, a surface of cover shell horizontal plateau 740 substantially abuts clamp horizontal plateau 708.

FIG. 27 also depicts a dish 750. It should be understood that the dish need not form part of the lid 700. In other words, in one embodiment, lid 700 is manufactured independently of dish 750. This allows lid 700 and dish 750 to be manufactured by the same or different manufacturers. Alternatively, in another embodiment, lid 700 and dish 750 are manufactured by the same manufacturer.

As shown in FIG. 27, dish 750 has a dish flange 752 and a dish sidewall 756. Dish flange 752 has a dish inner edge 752A and a dish outer edge 752B. The distance between dish inner edge 752A and a dish outer edge 752B defines a width of the dish flange 752 (Width_D_Flange). In the case of a round dish, the radius of dish 750 as measured from the center of dish 750 to dish outer edge 752B of dish flange 752 (Radius_Dish_OuterEdge) is shorter than the radius of clamp 704 as measured from the center of clamp 704 to outer edge 708B of clamp horizontal plateau 708. Similarly, the radius of the dish inner edge 752A of dish flange 752 is shorter than the radius of a corresponding inner edge 708A of clamp horizontal plateau 708. In some embodiments, clamp 704 further includes one or more dish couplers 712. Dish coupler 712 is constructed to releasably engage with dish 750.

Figure 28:
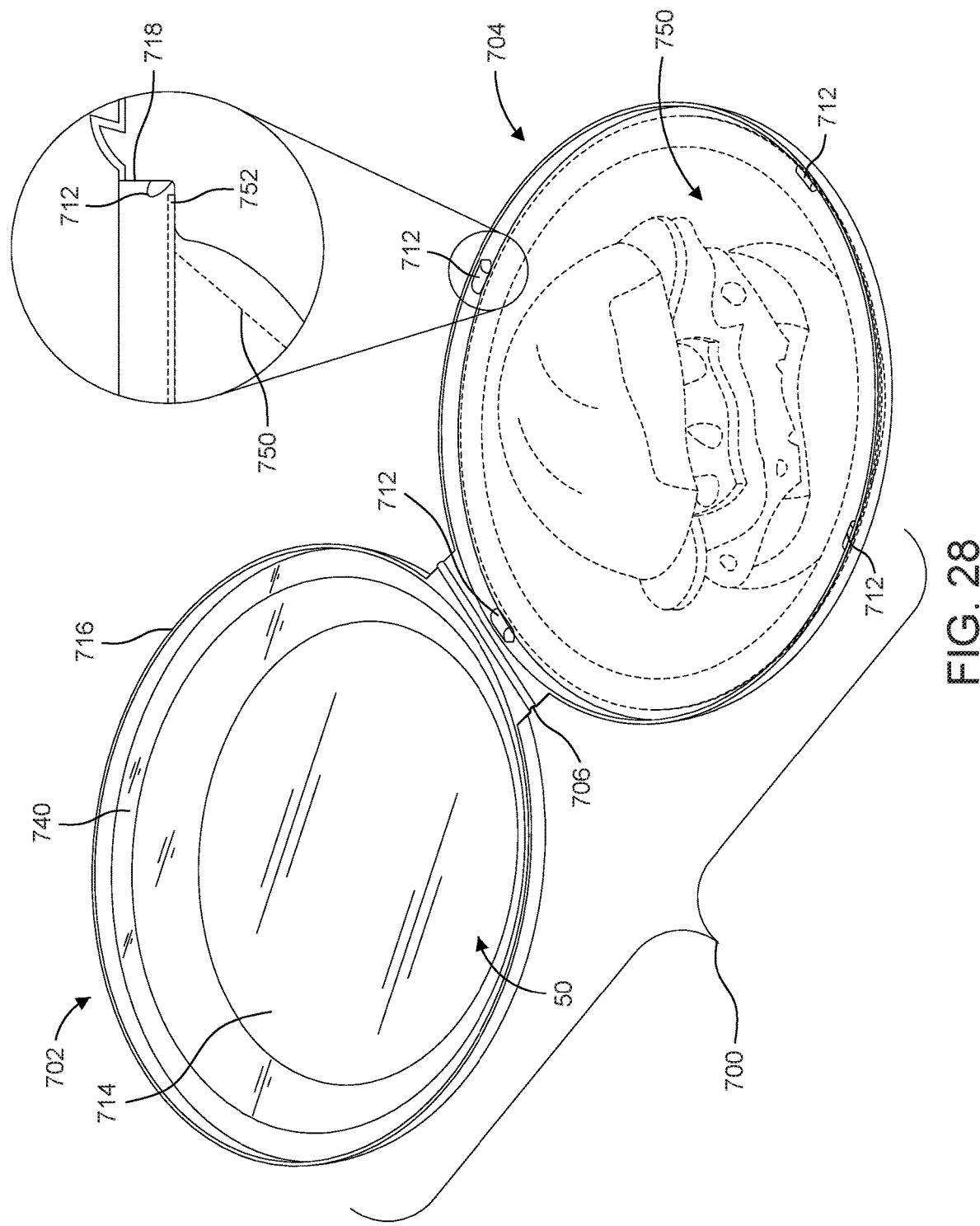
FIG. 28 is a perspective view of a lid in usage with a cover shell of the lid in the open position according to an embodiment of the present invention.

FIG. 28 is a perspective view of a lid 700 in usage with a cover shell 702 of the lid in the open position according to an embodiment of the present invention.

In an example embodiment, dish 750 is fed through clamp top opening 705 and clamp bottom opening 707 until a dish flange 752 of dish 750 slides past dish coupler 712 and rests on clamp horizontal plateau 708. The outer surface of dish sidewall 756 rests on frustum portion 722. Dish coupler 712 prevents clamp 704 and dish 750 from disengaging and the inner surface of frustum portion 722 remains adjacent to a corresponding portion of the outer surface of dish 750. In the example embodiment shown in FIG. 28, four dish couplers 712 are shown and the dish flange 752 is releasably engaged with the dish couplers 712. It should be understood that this embodiment is merely one example embodiment. Dish coupler 712 can be a continuous dish coupler around the upstanding lip 718 (i.e., a single dish coupler). It should also be understood that the dish coupler 712 can be shaped differently to accommodate one or more types of dish rims or flanges.

Once engaged, dish 750 can be disengaged from the dish coupler 712 by placing sufficient pressure (e.g., using a thumb) on upstanding lip 718 of clamp 704. The pressure will raise dish coupler 712 away from dish flange 752 to release the dish 750. It may be necessary to perform this step at different locations on clamp 704 in order to release the dish 750, such as substantially near one or more other couplers 712 until the dish flange 752 is disengaged from the one or more dish couplers 712.

In some embodiments, a dish coupler 712 can be integrally formed on the upstanding lip 718 as one or more protrusions facing inwardly. An example side view of such dish coupler 712 is shown in FIG. 28. It should be understood dish coupler can be in the form of any now known or future developed protrusion that can be used to releasably engage a dish 750 with clamp 704. For example, such protrusion can be defined by a convexity, protuberance, nose, projection, beak, crest or other similar shape protruding towards the inside of clamp 704. Such shapes also can be defined by a circular arc or sector, or by an elliptical portion or similar curve. In another implementation, for example, dish coupler 712 includes a dish coupler outer lip and a dish coupler trough as described above in connection with FIG. 15A.

Figure 29:
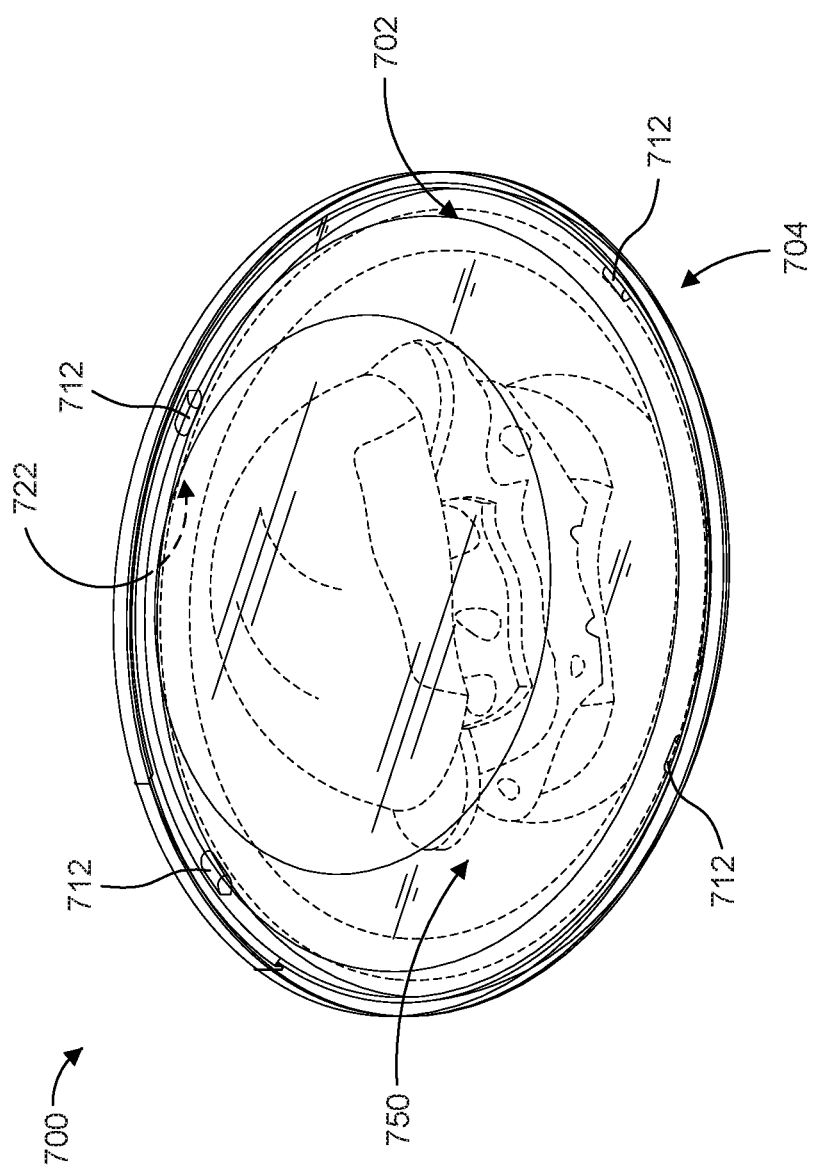
FIG. 29 depicts a perspective view of a lid in usage when cover of the lid is detachably secured to clamp in accordance with an embodiment of the present invention.

FIG. 29 depicts a perspective view of a lid 700 in usage when cover shell 702 of the lid 700 is detachably secured to clamp 704, in accordance with an embodiment of the present invention. The dish flange 752 rests on the clamp horizontal plateau 708 and the outside of the dish sidewall 756 becomes seated on frustum portion 722 of clamp 704 and releasably engaged with dish coupler 712 of clamp 704. In this embodiment, clamp 704 secures the dish 750 by the application of pressure generated by dish coupler 712 when the dish 750 are releasably engaged.

Referring again to FIG. 14, in some embodiments, the cover shell 702 is releasably secured to the clamp 704 using a locking mechanism. In an example embodiment, the locking mechanism includes male element formed on clamp horizontal plateau 708 and adapted to be received in female element (e.g., bore) formed on a corresponding location on cover shell horizontal plateau 740 of cover shell 702. The male element and female element are constructed to be in snap engagement to securely lock the cover shell 702 to clamp 704. It should be understood that such a locking mechanism is merely an example. Lid 700 can include another known or future known locking mechanism that releasably couples cover shell 702 and clamp 704. Such other interlocking mechanism would still be within the scope of the invention (e.g., a tab-interlocking mechanism, a latch, a fastener, a re-sealable zipper interlocking mechanism, and the like).

Referring again to FIG. 14 above, in some embodiments, the cover shell 702 is releasably secured to the clamp 704 using a locking mechanism such as the locking mechanism described above in connection with locking mechanism 210 (not depicted in FIGS. 27-39). Male element 210-1 is formed on clamp horizontal plateau 708 and adapted to be received in female element 210-2 (e.g., bore) formed on a corresponding location on cover shell horizontal plateau 740 of cover shell 702. The male element 210-1 and female element 210-2 are constructed to be in snap engagement to securely lock the cover shell 702 to clamp 704. It should be understood that the locking mechanism 210 depicted in FIG. 14 is merely an example.

As explained above, environmental elements (such as light, relative humidity, and temperature) affect compostable and polypropylene packaging differently. Similarly, such elements affect different parts of packaging made from the same material. One technical problem solved by aspects of the present invention relates to minimizing the effect changes in the elements of the environment have on different parts of packaging. Changes in the elements of the environment can affect the mechanical connections of conventional lid/dish combinations. In some cases the lids either pop off the dish and in some cases they become more difficult to take off.

The solution is to provide a lid that holds dish 750 in place such that changes is the dimensions of the lid and dish caused by the elements do not affect the general stability of the coupling of dish 750 and clamp 704. According in some embodiments, the engagement of a dish flange 752 and clamp 704 using dish coupler 712 is sufficient to prevent the dish from separating while allowing the dimensions of the lid 700 and dish 750 to expand, contract or otherwise deform differently. It will be understood that the amount of pressure necessary to release dish 750 from lid 700 can vary. Aspects of dish 750 and lid 700 that can affect the engagement of dish 750 and lid 700 include the surface deformation of the dish 750; the arc and elasticity of dish coupler 712, the dimensions of dish flange 752, and the like. Changes to these elements to account for shape, dimensions of lid 700 and dish 750 can be made and still be within the scope of the present invention. For example, rather than implement a dish coupler 712 that is arced, dish coupler 712 can be substantially flat.

In one example embodiment, the elements of lid 700 are formed from the same material as dish 750. The cooperation of the cover shell 702 and the clamp 704 when housing a dish 750 are not affected by differences in deformations of the lid 700 and dish 750 that are subject to the same elements of the environment. In another example embodiment, the elements of lid 700 are formed from a different material than dish 750. The cooperation of the dish 750 and clamp 704 when housing a dish 750 also are not substantially affected by differences in deformations of the lid 700 and dish 750 that are subject to the same elements of the environment.

In some embodiments, the dish coupler 312 is continuous around upstanding lip 718 of clamp 704 and the engagement of dish coupler 712 with dish flange 752 forms a seal sufficient to resist the passage of material stored within dish 750 between the cavity of dish 750 and dish coupler 712.

In some embodiments, a seal is formed on frustum portion 722.

The combination of the cover shell 702 and the dish 750 substantially define a total cavity volume. The cover shell 702 defines a first cavity 50 and the dish 750 define a second cavity 60. In some embodiments, the volume of the first cavity 50 is less than the volume of the second cavity 60. In some embodiments, the volume of the first cavity 50 is greater than the volume of the second cavity 60. In some embodiments, the volume of the first cavity 50 is equal to the volume of the second cavity 60.

In some embodiments, lid 700 is made of a first material and dish 750 is made of a second material, wherein the first material and the second material have different thermal expansion properties. That is, the lid 700 may have the tendency to change its shape, area, and volume in response to a change in temperature. In some embodiments, the lid 700 made from the first material and the dish 750 made from the second material expand or contract differently when subjected to changes in temperature. In some embodiments, the first material is a negative thermal expansion (NTE) material that shrinks when heated and expands when cooled. For example, the first material can be made of aluminum, polypropylene (plastic), or polystyrene (Styrofoam). In some embodiments, the second material is a compostable-type material such as wheat, sugarcane, balsa wood, palm leaf and paper, to name a few.

In some embodiments, lid 700 is made from a material that is susceptible to deformation when heated or cooled. When at least a portion of the lid is heated or cooled, thermal stresses in the lid 700 or dish 750, causing either the lid 700 or the dish 750 to thus expand or contract differently than the portion that was heated or cooled. In a preferred embodiment, the arrangement of the locking mechanism provide sufficient vertical and horizontal spacing to allow for play between the lid 700 and the dish 750. The play can be selected such that deformations caused by changes in temperature typically encountered in food transport do not substantially affect the engagement of the clamp 704 and dish 750.

Figure 30:
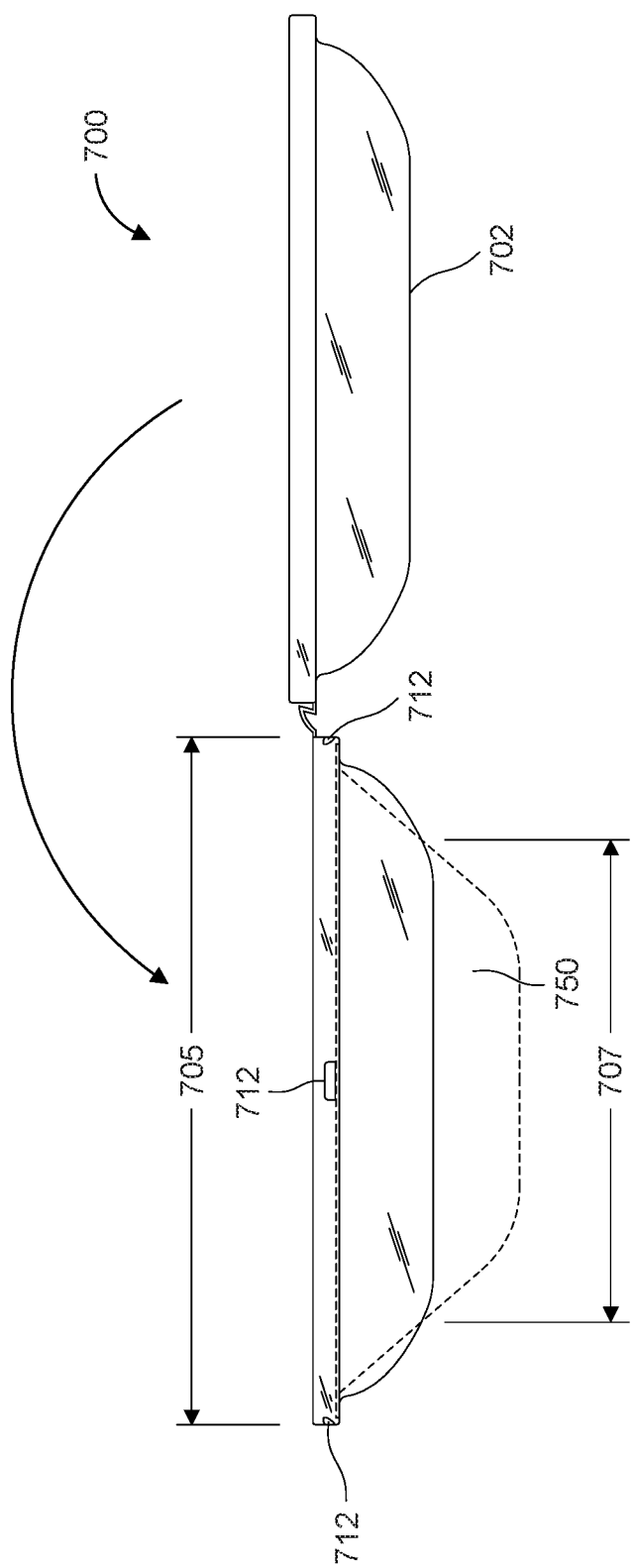
FIG. 30 is a side view of a lid in usage with a cover shell of the lid in the open position according to an embodiment of the present invention.

FIG. 30 a side view of a lid 700 in usage with a cover shell 702 of the lid in the open position according to an embodiment of the present invention. As shown in FIG. 30, the clamp 704 is constructed to receive dish 750 until dish 750 rests on frustum portion 722 and is secured by dish coupler 712. The frustum portion 722 of clamp 704 provides a place for support of the dish 750 when the dish 750 rests on the frustum portion 722.

Figure 31:
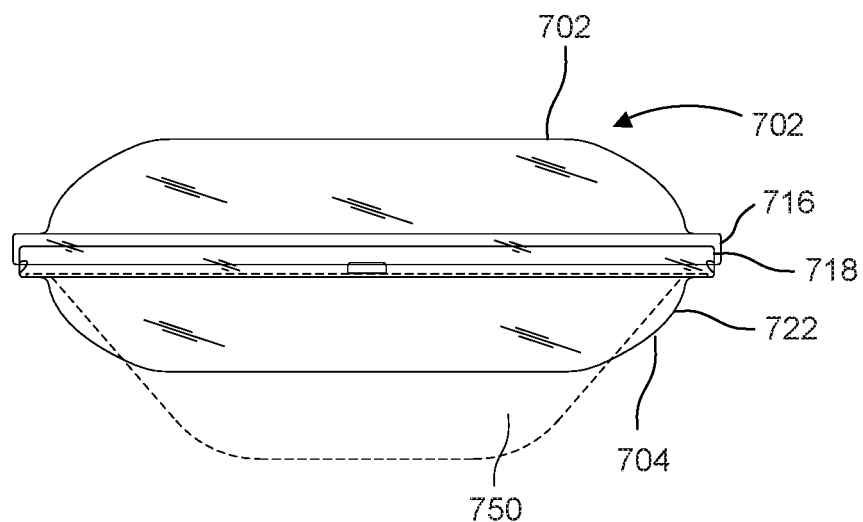
FIG. 31 is a front view of a lid in usage with a cover shell of the lid in the closed position according to an embodiment of the present invention.

FIG. 31 is a front view of a lid 700 in usage with a cover shell of the lid in the closed position according to an embodiment of the present invention. As shown in FIG. 31, clamp 704 is constructed to receive dish 750 through clamp top opening 705 and clamp bottom opening 707 until dish 750 rests on the frustum portion 722. The frustum portion 722 of clamp 704 provides a place for support of the dish 750 when the dish 750 rests on the frustum portion 722 and engages with dish coupler 712.

Figure 32:
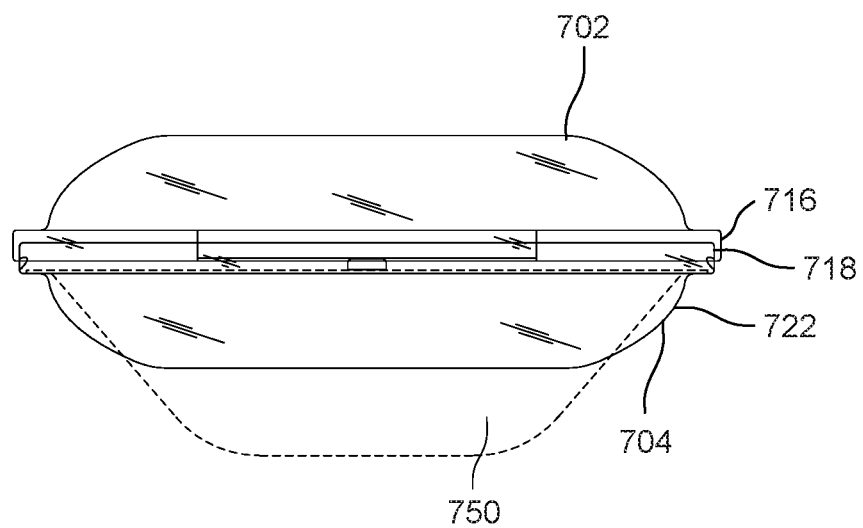
FIG. 32 is a rear view of a lid in usage with a cover shell of the lid in the closed position according to an embodiment of the present invention.

FIG. 32 is a rear view of a lid 700 in usage with a cover shell 702 of the lid in the closed position according to an embodiment of the present invention.

Figure 33:
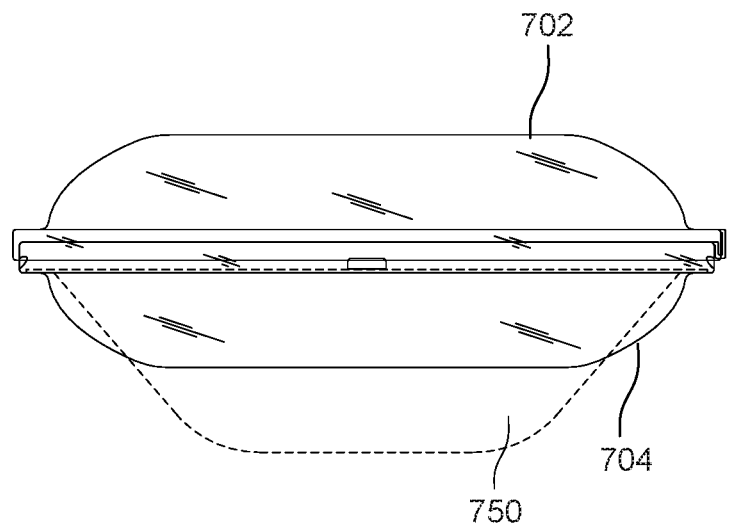
FIG. 33 is a right side view of a lid in usage with a cover shell of the lid in the closed position according to an embodiment of the present invention.

FIG. 33 is a right side view of a lid 700 in usage with a cover shell 702 of the lid in the closed position according to an embodiment of the present invention.

Figure 34:
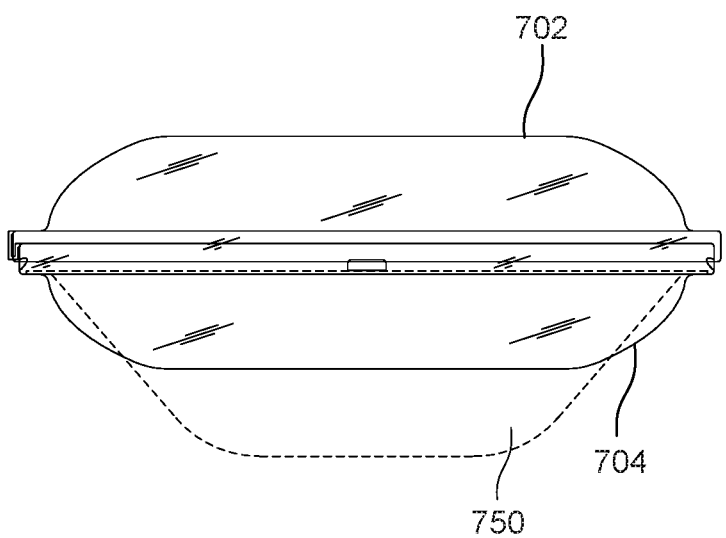
FIG. 34 is a left side view of a lid in usage with a cover shell of the lid in the closed position according to an embodiment of the present invention.

FIG. 34 is a left side view of a lid 700 in usage with a cover shell 702 of the lid in the closed position according to an embodiment of the present invention.

Figure 35:
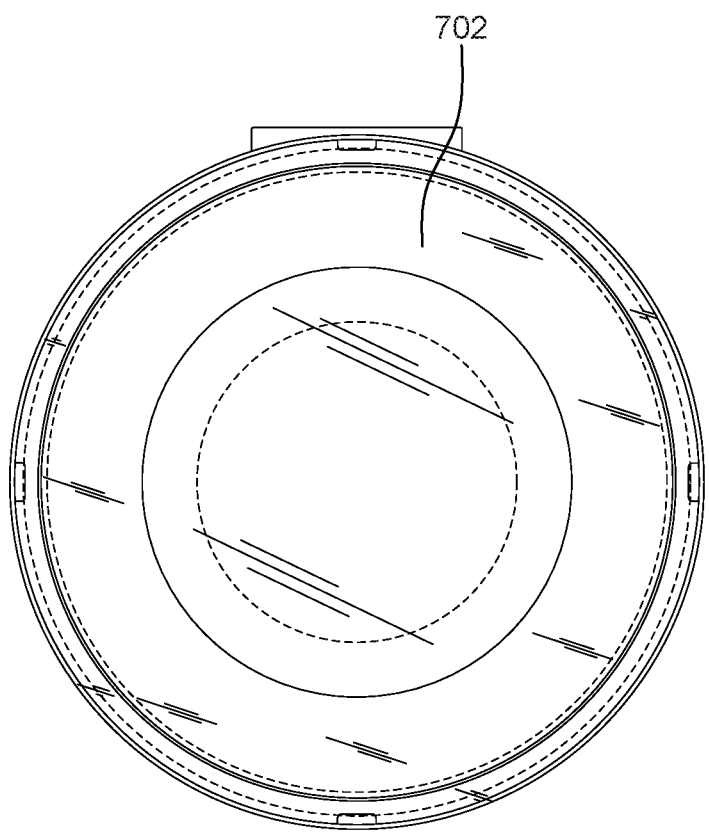
FIG. 35 is a top view of a lid in usage with a cover shell of the lid in the closed position according to an embodiment of the present invention.

FIG. 35 is a top view of a lid 700 in usage with a cover shell 702 of the lid in the closed position according to an embodiment of the present invention.

Figure 36:
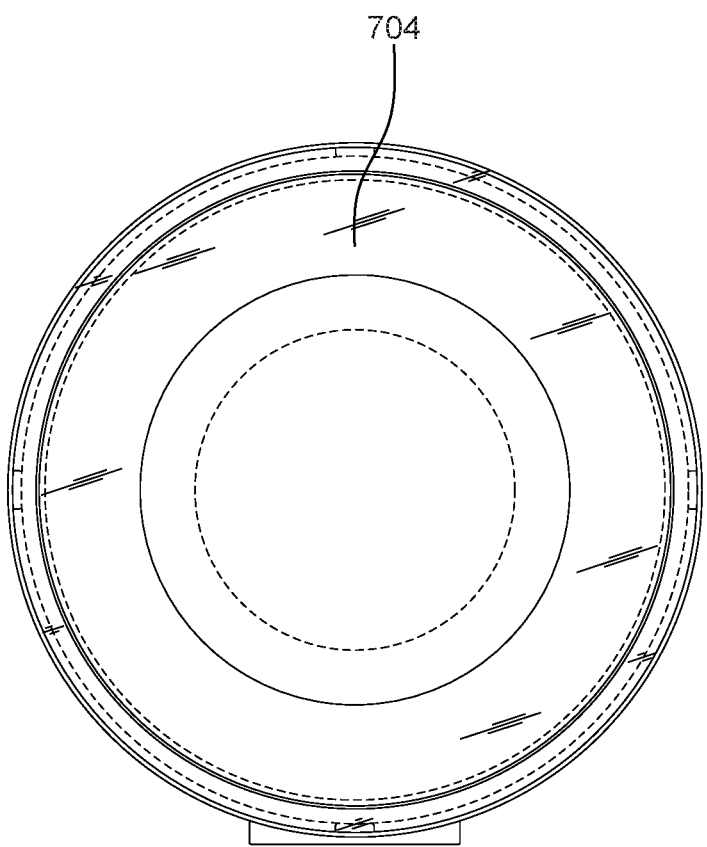
FIG. 36 is a bottom view of a lid in usage with a cover shell of the lid in the closed position according to an embodiment of the present invention.

FIG. 36 is a bottom view of a lid 700 in usage with a cover shell of the lid in the closed position, according to an embodiment of the present invention. The outside surface of the clamp 704 can be seen from this view.

Figure 37:
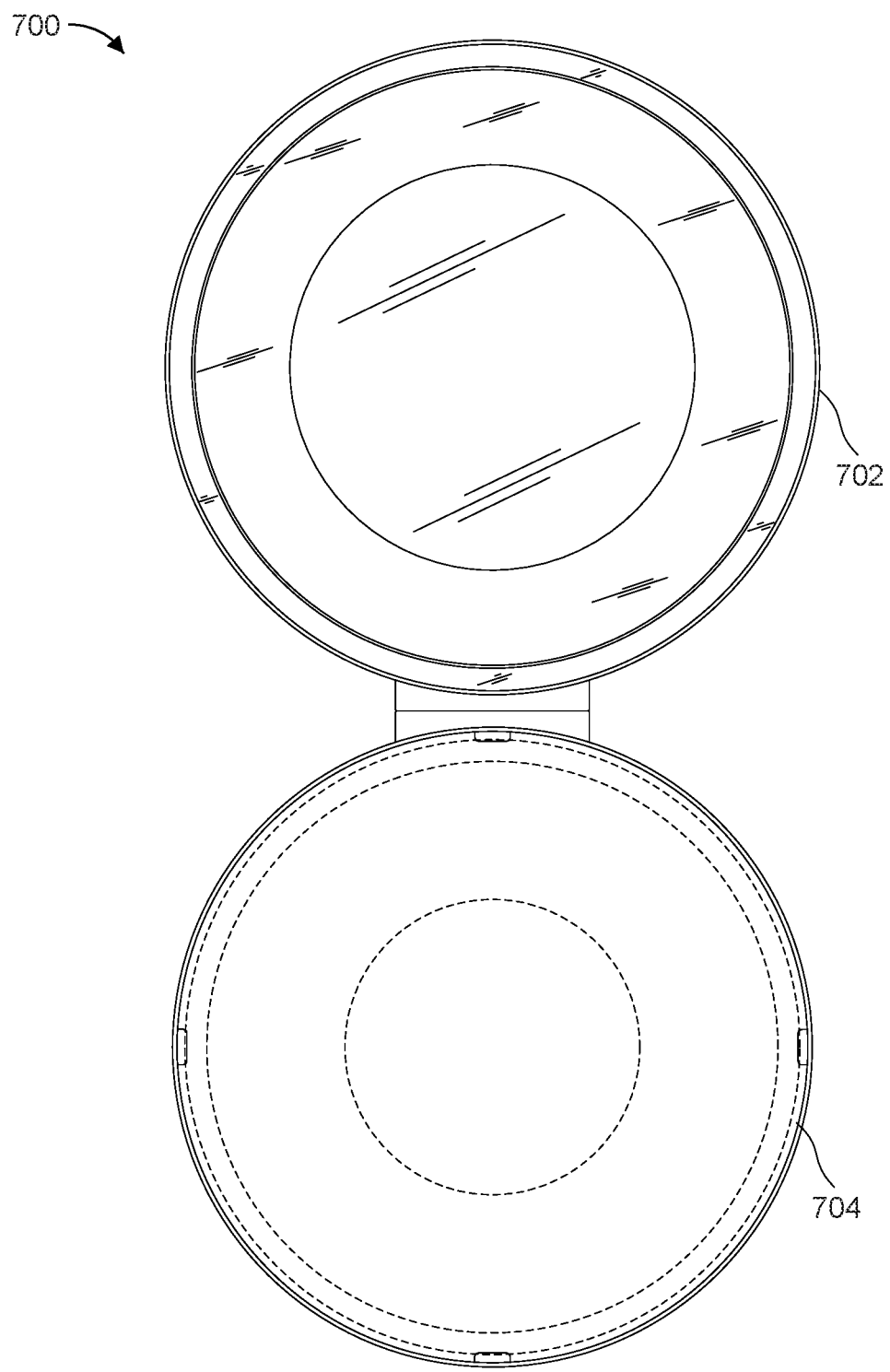
FIG. 37 is a top view of a lid with a cover shell of the lid in the open position according to an embodiment of the present invention.

FIG. 37 is a top view of a lid with a cover shell 702 of the lid 700 in the open position according to an embodiment of the present invention.

Figure 38:
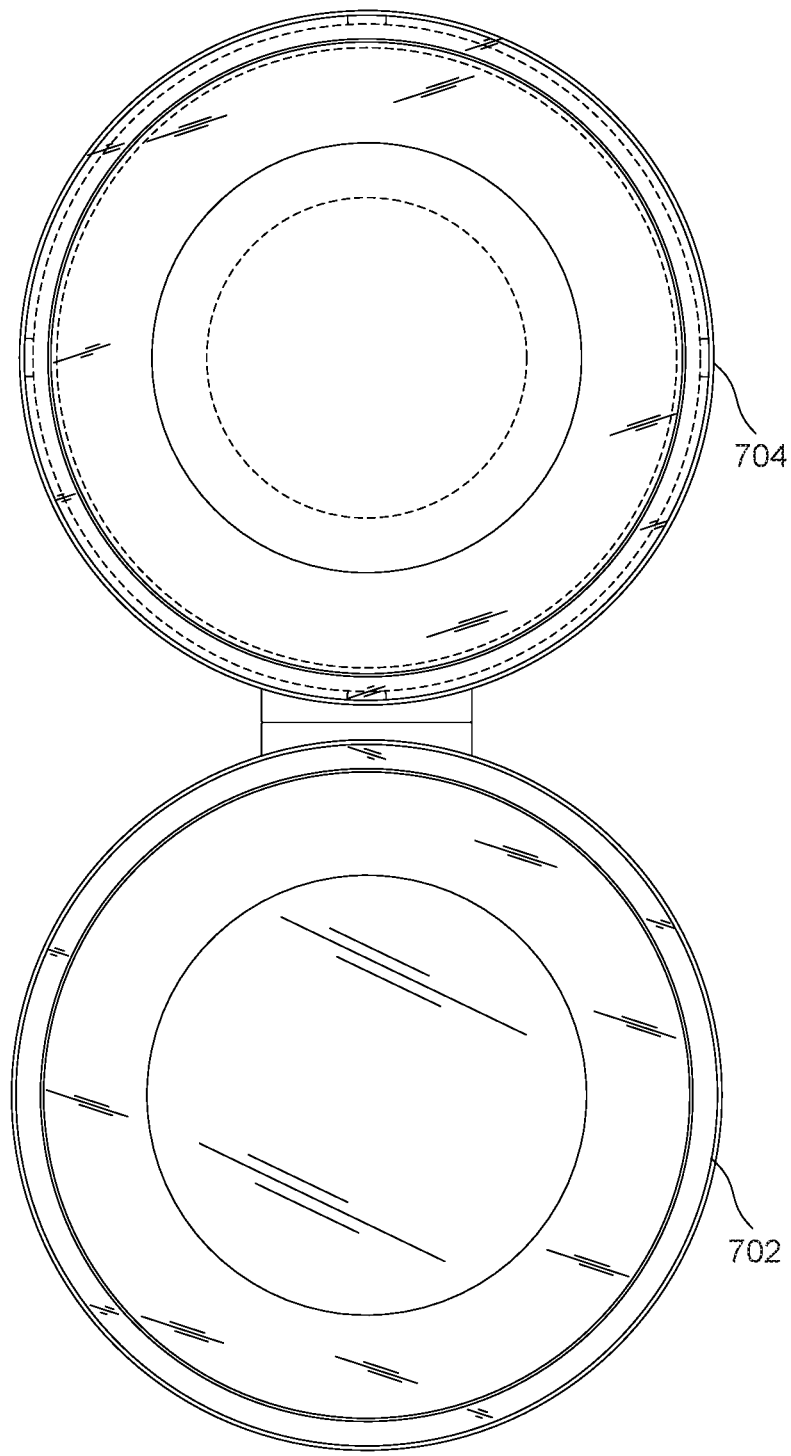
FIG. 38 is a bottom view of a lid with a cover shell of the lid in the open position according to an embodiment of the present invention.

FIG. 38 is a bottom view of a lid 700 with a cover shell 702 of the lid in the open position according to an embodiment of the present invention.

Figure 39:
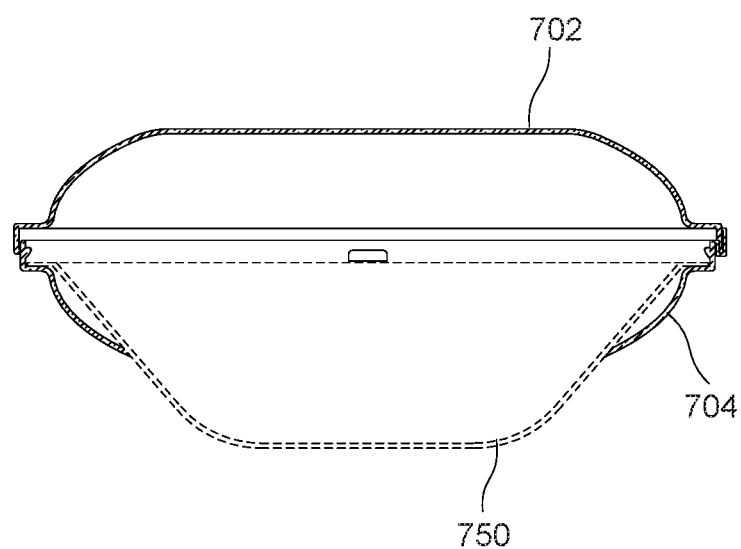
FIG. 39 is a front cross section of a lid in usage with a cover shell of the lid in the closed position according to an embodiment of the present invention.

FIG. 39 is a front cross section of a lid 700 in usage with a cover shell 702 of the lid in the closed position according to an embodiment of the present invention.

It should be understood that any of the examples described herein can include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that any procedures recited in the claims need not be performed in the order presented

What is claimed is:

1. A lid for outfitting a container, the lid comprising:
   a cover shell defining a first cavity;
   a clamp configured to support a dish, the clamp including a frustum portion; and
   a hinge member constructed to pivotally interconnect the clamp with the cover shell;
   the cover shell being releasably lockable to the clamp; and
   the combination of the cover shell, a portion of the clamp, and the dish defining a total interior cavity volume.

2. The lid according to claim 1, wherein the frustum portion includes at least one of (i) a pyramidal frustum portion, (ii) a conical frustum portion, (iii) a spherical frustum portion, or (iv) any combination of (i), (ii) and (iii).

3. The lid according to claim 1, clamp further comprising:
   a clamp top opening; and
   a clamp bottom opening.

4. The lid according to claim 3, wherein the clamp top opening is formed in any one of a radial shape, an oval shape, a round shape, or a rounded shape.

5. The lid according to claim 3, wherein the clamp top opening generally conforms to a shape of a portion of a dish that is inserted through the clamp.

6. The lid according to claim 1, the cover shell including a cover shell horizontal plateau and the clamp including a clamp horizontal plateau having a shape corresponding generally to the shape of the cover shell horizontal plateau.

7. The lid according to claim 1:
   the cover shell including a downstanding lip extending from a cover shell horizontal plateau; and
   the clamp including an upstanding lip extending from a clamp horizontal plateau;
   wherein, when the cover shell is closed over the clamp, the downstanding lip operates as a skirt surrounding upstanding lip.

8. The lid according to claim 1, wherein the clamp further includes a dish coupler constructed to releasably engage with a dish.

9. The lid according to claim 8, wherein the dish coupler includes a dish coupler outer lip and a dish coupler trough.

10. The lid according to claim 8, wherein the dish coupler is a protrusion integrally formed on the frustum portion.

11. The lid according to claim 1, the cover shell releasably secured to the clamp using a locking mechanism.

12. The lid according to claim 11, the locking mechanism including a male element formed on the clamp horizontal plateau and adapted to be received in female element formed on a corresponding location on the cover shell horizontal plateau of the cover shell.

13. The lid according to claim 12, the male element and the female element constructed to be in snap engagement to securely lock the cover shell to clamp.

14. The lid according to claim 1, wherein the lid is made of a first material and dish is made of a second material, wherein the first material and the second material have different thermal expansion properties.

* * * * *